(12) United States Patent
Suzuki et al.

(10) Patent No.: US 8,734,021 B2
(45) Date of Patent: May 27, 2014

(54) ROLLING BEARING DEVICE AND SPINDLE

(75) Inventors: Kazuya Suzuki, Kashiwara (JP);
Kiyoshi Tanimoto, Kashiwara (JP);
Hiroshi Ueno, Tondabayashi (JP); Shinji Fukuda, Kashiwara (JP)

(73) Assignee: JTEKT Corporation, Osaka-Shi, Osaka (JP)

(*) Notice: Subject to any disclaimer, the term of this patent is extended or adjusted under 35 U.S.C. 154(b) by 1067 days.

(21) Appl. No.: 11/792,859

(22) PCT Filed: Dec. 14, 2005

(86) PCT No.: PCT/JP2005/022984
§ 371 (c)(1),
(2), (4) Date: Oct. 1, 2007

(87) PCT Pub. No.: WO2006/064858
PCT Pub. Date: Jun. 22, 2006

(65) Prior Publication Data
US 2008/0080801 A1    Apr. 3, 2008

(30) Foreign Application Priority Data

Dec. 14, 2004 (JP) ................. P2004-360667
Dec. 20, 2004 (JP) ................. P2004-367066
Dec. 24, 2004 (JP) ................. P2004-372682

(51) Int. Cl.
*F16C 33/66* (2006.01)
(52) U.S. Cl.
USPC ........................................ 384/473
(58) Field of Classification Search
USPC ......... 384/399, 471, 474, 462, 465, 466, 475;
184/6.26, 11.1, 11.2, 13.1, 39.1, 55.1;
239/556, 565, 566, 597, 598
See application file for complete search history.

(56) References Cited

U.S. PATENT DOCUMENTS 2,841,244 A * 7/1958 Sorem ........................ 184/109
2,922,491 A * 1/1960 Macks ........................ 184/109
(Continued)

FOREIGN PATENT DOCUMENTS

JP    45-32642    12/1970
JP    60-3397     1/1985
(Continued)

OTHER PUBLICATIONS

Notification of Reason(s) for Refusal dated Jun. 9, 2010, with English translation.
(Continued)

*Primary Examiner* — Thomas Diaz
(74) *Attorney, Agent, or Firm* — McGinn IP Law Group, PLLC

(57) ABSTRACT

By incorporating a pump for sucking and discharging lubricating oil in a tank for storing the lubricating oil on an outside of a rolling bearing, for example, on a spacer for an outer ring in a housing for accommodating the rolling bearing and a nozzle in which an lubricating oil outlet communicating with a discharging port of the pump to supply the lubricating oil discharged from the pump to the rolling bearing is opened in an annular-shaped space between a fixed ring and a rolling ring in the rolling bearing, a cost is reduced by using a general-purpose rolling bearing, and at the same time, external devices and pipes for a lubrication are not required wholly or partially and problems of a noise made by compressed air are eliminated.

20 Claims, 35 Drawing Sheets

(56) References Cited

U.S. PATENT DOCUMENTS

| | | | |
|---|---|---|---|
| 3,628,835 A * | 12/1971 | Cornish et al. | 384/465 |
| 3,722,967 A * | 3/1973 | Lewis | 384/466 |
| 3,811,743 A * | 5/1974 | Wren | 384/475 |
| 4,006,944 A * | 2/1977 | Ando et al. | 384/466 |
| 4,353,508 A * | 10/1982 | Butterfield et al. | 239/590.3 |
| 4,571,097 A * | 2/1986 | Lee et al. | 384/469 |
| 4,759,427 A * | 7/1988 | Onose et al. | 184/6.26 |
| 6,431,760 B1 | 8/2002 | Nawamoto et al. | |
| 7,293,919 B2 * | 11/2007 | Ueno et al. | 384/473 |
| 2005/0141796 A1 * | 6/2005 | Katsuzawa et al. | 384/473 |
| 2006/0165328 A1 | 7/2006 | Ueno et al. | |

FOREIGN PATENT DOCUMENTS

| | | |
|---|---|---|
| JP | 60-114324 | 8/1985 |
| JP | 63-12315 Y2 | 4/1988 |
| JP | 3-23065 | 3/1991 |
| JP | 4-62417 | 5/1992 |
| JP | 8-338426 | 12/1996 |
| JP | 2001-153144 (A) | 6/2001 |
| JP | 2002-525516 | 8/2002 |
| JP | 2003-83343 | 3/2003 |
| JP | 2004-108388 | 8/2004 |
| JP | 2004-316707 | 11/2004 |
| JP | 2004-316707 A | 11/2004 |
| WO | WO 2004/025130 A1 | 3/2004 |
| WO | WO 2004/025130 (A1) | 3/2004 |

OTHER PUBLICATIONS

Notification of Reason(s) for Refusal dated Feb. 10, 2010, with English translation.
Notification of Reason(s) for Refusal dated Sep. 8, 2010, with English translation.
Notification of Reason(s) for Refusal dated Jan. 27, 2010, with English translation.
Notification of Reason(s) for Refusal dated Apr. 28, 2010, with English translation.
Chinese Office Action dated Mar. 20, 2009 with English-language translation.

* cited by examiner

ROLLING BEARING DEVICE AND SPINDLE

TECHNICAL FIELD

The present invention relates to a rolling bearing device and a spindle using the same, and more particularly to a rolling bearing device having a self-lubricating function and a spindle using the same.

BACKGROUND ART

For example, a rolling bearing such as an angular ball bearing is used for supporting rotating shafts at a comparatively high speed such as various spindles to be used in a machine tool. As a lubricating method for the rolling bearing to support the high-speed rotating shafts, conventionally, an oil air lubricating method has mainly been used often.

In the oil air lubricating method, a very small amount of lubricating oil supplied intermittently is sprayed toward the rolling bearing by compressed air through a pipe. In order to break through an air curtain formed around the rolling bearing rotated at a high speed to supply the lubricating oil to the bearing, the compressed air is used as a so-called carrier. FIG. 19 is a view including a sectional view illustrating an example of a structure of a spindle using the lubricating method and a block diagram illustrating an example of a structure of an external device for lubrication.

This example represents a lubrication for a spindle 21 which rotatably supports a rotating shaft 312 by means of four angular ball bearings 313 in a housing 311, an oil air lubricating device 22 includes a lubricating oil tank and a pump for supplying lubricating oil in the tank to a plunger for supplying a certain amount of lubricating oil in addition to the plunger, and the lubricating oil supplied from the oil air lubricating device 22 and compressed air obtained by cleaning compressed air sent from a compressor 23 by means of an air clean unit 24 are mixed by means of a mixing valve 25 and the mixture is supplied to the spindle 21 through a pipe 26. In the spindle 21, a hole 331 for an oil air lubrication is formed on the housing 311 corresponding to each angular ball bearing 313, and furthermore, a hole 332 having one of ends communicating with the hole 331 of the housing 21 and the other end opposed to an annular-shaped space between an inner ring 313a and an outer ring 313b in the angular ball bearing 313 is also formed on a spacer 314 fixed adjacently to a fixed ring of the angular ball bearing 313, that is, the outer ring 313b in this example. A nozzle 333 is provided in an opening portion facing an annular-shaped space of the hole 332 and oil air is jetted from the nozzle 333.

In the oil air lubricating method, it is necessary to provide an oil air lubricating device, a mixing valve, a compressor and an external pipe on the outside of the spindle, and furthermore, to form a passage for the oil air in the spindle. Consequently, a cost is increased. In addition, there is also a problem in that a noise level is increased because the compressed air is used.

In order to solve such a problem, there has been proposed a rolling bearing device in which a lubricating oil supply mechanism is provided in a rolling bearing (for example, see Patent Document 1).

In the proposed technique, as shown in an axial sectional view of FIG. 20, an oil feeding unit comprising a tank 35 for storing lubricating oil, a pump 36 for sucking and discharging the lubricating oil in the tank 35, a nozzle 37 attached to a discharge port of the pump 36 and extended to the vicinity of rolling elements 33 in an annular-shaped space between an inner ring 31 and an outer ring 32 is fixed to a seal 34 fixed to a fixed ring of a rolling bearing having main components of the inner ring 31, the outer ring 32 and the rolling elements 33, for example, the outer ring 32, and the lubricating oil in a very small amount of approximately several tens nl (several tens μcc) is dropped into an inside of an air curtain formed during the rotation of the rolling bearing through a tip of the nozzle 36.

According to the proposed technique, it is not necessary to provide devices and pipes on the outside of the spindle for carrying out an oil air lubrication over the rolling bearing. Moreover, it is not necessary to form a passage for the oil air lubrication in the spindle and it is also possible to solve the problems of noises because of non-use of the compressed air.
Patent Document 1: JP-A-2004-108388
Patent Document 2: JP-A-2004-316707

DISCLOSURE OF THE INVENTION

Problems to be Solved

In the technique disclosed in the Patent Document 1, it is necessary to carry out a special processing over a raceway rings in order to provide the oil feeding unit in the rolling bearing. Moreover, a shape of the raceway rings is entirely different from that of a rolling bearing to be usually used.

Since it is necessary to add a special processing to the raceway rings of the rolling bearing which originally requires a processing with high precision, it is hard to suppress a rise in a cost. In the bearing device, moreover, a raceway rings having a special shape is used. For this reason, a general-purpose rolling bearing cannot be used but a dedicated raceway rings is utilized. Also in this respect, it is difficult to suppress the rise in the cost. Since the raceway rings having the special shape is used, furthermore, a width is different from that of the general-purpose rolling bearing so that a design is complicated. In addition, it is necessary to exchange the whole bearing device due to a failure of any of a micropump and a driving portion which constitute the oil feeding unit and a failure caused by any of a fixed ring, a rotary ring, rolling elements and a cage.

FIG. 21A is a typical sectional view showing a nozzle for lubricant supply provided in the oil feeding unit which is used in the rolling bearing device of FIG. 20 as seen in a radial direction of the bearing, and FIG. 21B is a view showing the nozzle seen in a circumferential direction of the bearing.

Moreover, the nozzle 37 for lubricant supply which is provided on the pump 36 of the oil feeding unit is formed by a pipe-shaped member shown in FIGS. 21A and 21B, and a hole (a tip hole 37z) for discharging lubricant is provided on an end face of a tip portion 37x. The tip portion 37x of the nozzle 37 is disposed in a position in the vicinity of a rolling raceway of the balls 33 between a cage 39 and the outer ring 32.

There has been known that a flow of air (an air current) is generated in the circumferential direction of the bearing by the rolling motion of the rolling elements in the annular-shaped space of the rolling bearing. In the oil feeding unit utilizing the lubricant which is not accelerated (pressurized) in a very small amount, therefore, the tip portion 37x of the nozzle 37 is inserted into the vicinity of the balls 33 in an annular-shaped space S in order to cause the lubricant to reach an inside of a barrier (an air barrier or an air curtain) by the air current and to efficiently supply (drop) the lubricant into a necessary portion.

In a conventional rolling bearing device, however, the tip of the nozzle 37 is cut to take a perpendicular shape (a parallel shape with the circumferential direction of the bearing) and the hole (the tip hole 37z) for discharging the lubricant is provided in an axial direction of the bearing. In some cases, consequently, an air current generated by a rotation of the bearing goes around so that a negative pressure is generated on the tip portion 37x and the lubricant naturally flows out of the pump 36.

In the case in which the amount of discharge of the lubricant is controlled by an intermittent operation of the micropump, moreover, there is a possibility that the lubricant might be discharged in an amount which is equal to or larger than an intended amount depending on conditions such as the rotating speed of the bearing.

In the conventional rolling bearing device, as shown in FIG. 22, lubricant O discharged from the hole on the nozzle tip 37X is moved in a direction of a base portion 37b of the nozzle on the pump 36 side along an outer peripheral surface 21a of the nozzle by the influence of the air current and a surface tension so that a stable drop into an aimed portion is hard in some cases.

The invention has been made to attain the problem and has an object to provide a rolling bearing device capable of accurately controlling the amount of lubricant to be supplied into an annular-shaped space without a natural flow of the lubricant with a rotation of a bearing.

Furthermore, the invention has been made to attain the problem and has a further object to provide a rolling bearing device capable of properly dropping lubricant into a predetermined portion and maintaining an excellent lubrication with a small amount of the lubricant.

Means for Solving the Problems

In order to achieve the objects, the invention provides a rolling bearing device comprising a pair of raceway members which are disposed concentrically and define an annular-shaped space therebetween, rolling elements disposed in the annular-shaped space, and a pump including a pipe-shaped nozzle which is disposed in the annular-shaped space or the vicinity thereof, wherein a tip portion of the nozzle is disposed in the annular-shaped space so as to supply lubricant to the vicinity of the rolling elements, and the nozzle is provided with a hole for discharging lubricating oil which is directed in a direction excluding an axial direction and a radial direction of the rolling bearing device.

Moreover, the rolling bearing device may further comprise a cage for holding the rolling elements in the annular-shaped space, and the tip portion of the nozzle may be disposed in the annular-shaped space so as to supply the lubricant to the vicinity of the rolling elements or the cage.

The invention serves to achieve the predetermined objects by placing the discharging port formed on the nozzle in a position in which a negative pressure caused by an air current generated by the rotation of the bearing is generated with difficulty in the rolling bearing device in which the oil feeding nozzle is inserted into the vicinity of the rolling elements or the cage to supply the lubricant by means of the pump.

More specifically, the hole for discharging the lubricant of the nozzle is formed in a direction excluding a perpendicular direction to an air current in the circumferential direction of the bearing which is generated in the annular-shaped space (the axial direction of the bearing and the radial direction of the bearing). Consequently, it is possible to reduce a negative pressure generated by the air current which goes around.

Moreover, it is desirable that the hole of the nozzle should be formed in a position corresponding to a circumferential direction of a bearing on a peripheral surface of the nozzle.

As compared with an end face of the nozzle tip which is flat and has a high probability to direct in the axial direction of the bearing, the peripheral surface of the nozzle has a large number of curved portions opposed to the direction of the flow of the air current and the negative pressure to act on the hole can be decreased comparatively easily. In particular, the provision of the hole in the circumferential direction of the bearing corresponding to the direction of the air current generated by the rotation of the bearing can produce the greatest effect of reducing the negative pressure. By this structure, the rolling bearing device according to the invention can accurately control the amount of the lubricant to be supplied into the annular-shaped space without the natural flow of the lubricant with the rotation of the bearing.

In the invention, the number of the holes for discharging the lubricant which are to be provided on the nozzle is not particularly restricted. Except for the positions corresponding to the axial direction of the bearing and the radial direction of the bearing in the nozzle, it is also possible to form a plurality of holes in the circumferential direction of the peripheral surface of the nozzle.

As described above, according to the invention, it is possible to obtain a compact rolling bearing device including the oil feeding unit, and at the same time, it is possible to suppress the discharge of the lubricant in an amount which is equal to or larger than the intended amount due to the natural flow. Thus, it is possible to obtain a rolling bearing device in which the oil can be automatically fed for a long period of time. Moreover, the amount of the lubricant to be supplied into the annular-shaped space of the bearing has no waste and it is possible to prevent the troubles of the bearing such as a lubricating failure or burning caused by the earlier exhaustion of the lubricant in the storing tank than an assumed time.

In order to achieve the objects, furthermore, the invention provides a rolling bearing device comprising a pair of raceway members which are disposed concentrically and define an annular-shaped space therebetween, rolling elements disposed in the annular-shaped space, and a pump including a pipe-shaped nozzle which is disposed in the annular-shaped space or the vicinity thereof, wherein a tip portion of the nozzle is disposed in the annular-shaped space so as to supply lubricant to the vicinity of the rolling elements, and the tip portion of the nozzle is provided with an opening taking a shape which is opened toward an upstream side of an air current generated in the annular-shaped space by a relative rotation of the raceway members.

Moreover, the rolling bearing device may further comprise a cage for holding the rolling elements in the annular-shaped space, and the tip portion of the nozzle may be disposed in the annular-shaped space so as to supply the lubricant to the vicinity of the rolling elements or the cage.

The invention serves to achieve the predetermined objects by causing the periphery of the discharging port of the tip of the nozzle to take such a shape as to generate a positive pressure in the nozzle tube by the air current generated by the rotation of the bearing for inserting the oil feeding nozzle to the vicinity of the rolling elements or the cage to supply the lubricant by means of the pump.

More specifically, the opening in the tip portion of the nozzle is formed toward an upstream side of the air current generated in the annular-shaped space by the relative rotation of the raceway members. Consequently, it is possible to reduce the negative pressure generated by the air current which goes around and to prevent the lubricant from naturally flowing out.

As a specific shape of the tip portion of the nozzle, it is desirable that an end face of the tip of the nozzle should be formed in a slant face directed toward the upstream side of the air current.

By forming the tip of the nozzle on the slant face opened toward the upstream side of the air current, the air current hits on the inner peripheral surface of the nozzle so that the lubricant is pushed toward the inside of the nozzle by a wind pressure thereof. Accordingly, the rolling bearing device according to the invention can maintain the lubricant in the nozzle tube to have the positive pressure so that the amount of the lubricant supplied into the annular-shaped space can be controlled accurately.

In order to achieve the objects, moreover, the invention provides a rolling bearing device comprising a pair of raceway members which are disposed concentrically and define an annular-shaped space therebetween, rolling elements disposed in the annular-shaped space, and a pump including a pipe-shaped nozzle which is disposed in the annular-shaped space or the vicinity thereof, wherein a tip portion of the nozzle is disposed in the annular-shaped space so as to supply lubricant to the vicinity of the rolling elements, and the tip portion of the nozzle is provided with a member for leading an air current generated in the annular-shaped space by a relative rotation of the raceway members toward the opening.

Furthermore, the rolling bearing device may further comprise a cage for holding the rolling elements in the annular-shaped space, and the tip portion of the nozzle may be disposed in the annular-shaped space so as to supply the lubricant to the vicinity of the rolling elements or the cage.

According to the structure, similarly, the lubricant is pressed toward the inside of the nozzle tube by the wind pressure of the air current. Consequently, it is possible to prevent the lubricant from naturally flowing out.

As described above, according to the invention, it is possible to obtain a compact rolling bearing device including the oil feeding unit, and at the same time, to obtain a rolling bearing device capable of suppressing the discharge of the lubricant in an amount which is equal to or larger than the intended amount due to a natural flow, thereby feeding the oil automatically for a long period of time.

Moreover, the amount of the lubricant to be supplied into the annular-shaped space of the bearing has no waste and it is possible to prevent the troubles of the bearing such as a lubricating failure or burning which is caused by an unexpected situation in which the lubricant in the storing tank is exhausted earlier than an assumed time, for example.

In order to achieve the objects, furthermore, the invention provides a rolling bearing device comprising a pair of raceway members which are disposed concentrically and define an annular-shaped space therebetween, rolling elements disposed in the annular-shaped space, and a pump including a pipe-shaped nozzle which is disposed in the annular-shaped space or the vicinity thereof, wherein a tip portion of the nozzle is disposed in the annular-shaped space so as to supply lubricant to the vicinity of the rolling elements, and lubricant holding portion protruded at least vertically and downward from a peripheral surface of the nozzle is formed on the tip of the nozzle or in the vicinity of the tip.

Moreover, the rolling bearing device may further comprise a cage for holding the rolling elements in the annular-shaped space, and the tip portion of the nozzle may be disposed in the annular-shaped space so as to supply the lubricant to the vicinity of the rolling elements or the cage.

The invention serves to achieve the predetermined objects by providing the lubricant holding portion for collecting the lubricant discharged to make a droplet in the vicinity of the discharging port of the tip of the nozzle in the rolling bearing device for inserting the oil feeding nozzle to the vicinity of the rolling elements or the cage to supply the lubricant by means of the pump.

More specifically, the lubricant holding portion protruded at least vertically and downward from the peripheral surface of the nozzle is formed on the tip of the nozzle or in the vicinity of the tip so that the lubricant discharged from the tip of the nozzle is pulled up to the lubricant holding portion and is hard to move toward the base portion side of the nozzle. Accordingly, the rolling bearing device according to the invention can properly drop the lubricant into a predetermined portion also in the case in which the tip of the nozzle is disposed in the annular-shaped space in which the air current is generated by the rolling motion of the rolling elements.

As specific forming means for the lubricant holding portion, it is possible to suitably employ a method of setting the vicinity of the tip of the nozzle to have a larger diameter than diameters of the other portions, a method of setting an opening diameter of the tip of the nozzle to be larger than inside diameters of the other portions, or a method of fitting an annular-shaped member in an outer peripheral surface of the nozzle.

By the structure, it is possible to easily form the lubricant holding portion. In the case in which the nozzle takes a shape of a pipe having a very small diameter, for example, an injection needle and it is hard to carry out a processing over the tip portion due to a shortage of a strength of the nozzle, moreover, an annular-shaped member may be fitted on an outer periphery in the vicinity of the tip.

As described above, according to the invention, also in the case in which the lubricant supply nozzle is disposed in the annular-shaped space of the rolling bearing in which the air current is generated by the rolling motion of the rolling elements, the lubricant can be properly dropped into a predetermined portion. Moreover, the lubricant to be supplied has no waste and an excellent lubrication of the rolling bearing device can be maintained with a small amount of the lubricant.

In order to achieve the objection, furthermore, the present invention provides a rolling bearing device comprising:

a pair of raceway members which are disposed concentrically and define an annular-shaped space therebetween; rolling elements disposed in the annular-shaped space; and a pump including a pipe-shaped nozzle which is disposed in a spacer disposed in the vicinity of the annular-shaped space or the vicinity thereof, in which a tip portion of the nozzle is disposed in the annular-shaped space so as to supply lubricant to the vicinity of the rolling elements, and the space is provided with an intermediate member between the space and one of the raceway members.

The rolling bearing device may further comprises a cage for holding the rolling elements in the annular-shaped space at predetermined intervals, the tip portion of the nozzle being disposed in the annular-shaped space so as to supply the lubricant to the vicinity of the rolling elements or the cage.

Further, the intermediate member may have an annular shape.

Further, at least three of the intermediate members may be disposed at constant intervals in a circumferential direction of the space.

Further, a fitting portion fitted with the intermediate member may be formed on at least one of a space and the raceway members, which is brought into contact with the intermediate member.

The intermediate member may have a C-shape.

In view of above, according to the present invention, since the intermediate member is disposed between the space and the fixed ring, the tip portion of the nozzle for supplying the lubricant can be adjusted to a position suitable for supplying a small amount of lubricant with respect to the ball, and thus it is possible to maintain an excellent bearing lubrication with a small amount of the lubricant.

BEST MODE FOR CARRYING OUT THE INVENTION

Example 1

An example 1 according to the invention will be described below with reference to the drawings.

FIG. 1 is an axial sectional view showing a structure of a spindle according to the example 1 of the invention and FIG. 2 is an enlarged view showing a main part thereof. Moreover, FIG. 3 is a front view showing a spacer 4 for an outer ring seen in a direction of an arrow A in FIG. 2.

A shaft 2 is rotatably supported by means of four angular ball bearings 3 in a housing 1. Each of the angular ball bearings 3 comprises an inner ring 3a to be fitted and fixed into the shaft 2, an outer ring 3b fitted over the housing 1, a plurality of rolling elements (balls) 3c disposed rollably therebetween, and a cage 3d for holding each of the rolling elements 3c at a certain interval in a circumferential direction, and is used for various purposes.

An inner flange 1a is formed integrally with one end side of the housing 1 and a cover member 1b is screwed into the other end side, and a movement of the outer ring 3b of each of the angular ball bearings 3 in an axial direction is blocked and it is thus positioned by means of cylindrical spacers 4 . . . 4 for the outer ring and a central spacer 5 which are disposed along an inner peripheral surface of the housing 1 between the inner flange 1a and the cover member 1b, and each outer ring 3b.

Moreover, a step portion 2a is formed on an end of the shaft 2 at a side where the cover member 1b is fixed, and furthermore, a female thread 2b is formed on an end at a side where the inner flange 1a is formed, and a bearing presser 6 is screwed into the female thread 2b. The movement of the inner ring 3a of each of the angular ball bearings 3 in the axial direction is blocked and it is thus positioned by means of the step portion 2a and the bearing presser 6, spacers 7 . . . 7 for an inner ring and a central spacer 8 which are disposed along an outer peripheral surface of the shaft 2 between the step portion 2a and the bearing presser 6, and each inner ring 3a.

An oil feeding unit is incorporated into the spacer 4 for an outer ring which is disposed adjacently to each of the outer rings 3b. The oil feeding unit is mainly constituted by a tank 9a for storing lubricating oil, a pump 9b for sucking and discharging the lubricating oil in the tank 9a, a nozzle 9c attached to a discharging port of the pump 9b, and a driving circuit 9d of the pump 9b as shown in FIGS. 2 and 3. These are fixed along an inner peripheral surface of the spacer 4 for an outer ring. As shown in FIG. 3, the nozzle 9c enters an annular-shaped space between the inner ring 3a and the outer ring 3b in the rolling bearing 3 and is thus opened in an upper part provided just close to the rolling elements 3c. The tank 9a and the pump 9b communicate with each other through a pipe 9e.

FIG. 4 is a view showing a whole structure of the oil feeding unit, including a typical view illustrating a mechanical structure and a block diagram illustrating an electrical structure together.

The pump 9b is constituted by a pump chamber 90, a diaphragm 91 for forming a wall member to be a part of the pump chamber 90, a piezoelectric unit 92 stuck to the diaphragm 91, and a check valve 93 provided in a connecting portion of the pump chamber 92 and the pipe 9e. The driving circuit 9d includes a power battery 94 and supplies a rectangular voltage signal to the piezoelectric unit 92. In the structure, the rectangular voltage signal is applied to the piezoelectric unit 92 so that the diaphragm 91 is displaced vertically in the drawing. The lubricating oil in the tank 9a is sucked into the pump chamber 90 through the check valve 93 and the pipe 9e in an upward displacement of the diaphragm 91 and the lubricating oil in the pump chamber 90 is discharged toward the nozzle 9c in a subsequent downward displacement, and the lubricating oil is dropped from a tip portion of the nozzle 9c into an upper part of the rolling elements 3c of the angular ball bearing 3. In the discharge of the lubricating oil of the pump 9b, the lubricating oil in the pump chamber 90 is not returned toward the pipe 9e side by the presence of the check valve 93. The amount of supply of the lubricating oil to the angular ball bearing 3 is approximately 30 nl (30 μcc). Depending on the conditions of use, the amount of supply of the lubricating oil can be changed from several hundreds pl to several hundreds nl.

According to the example in accordance with the invention, an apparatus for a whole lubrication is not required on the outside of the spindle, and the structure of the apparatus can be simplified and a reduction in a cost can be achieved, and at the same time, the compressed air is not used. Therefore, it is also possible to solve the problem of a noise.

While the oil feeding unit is incorporated in the spacer 4 for an outer ring in the example, the invention is not restricted thereto but a position in which the oil feeding unit is to be provided can be set into another position in the housing on the outside of the rolling bearing. FIGS. 5 and 6 show the example.

FIG. 5 shows the example in which an equivalent oil feeding unit to that in the prior example is incorporated in the cover member 1b attached to one of the ends of the housing 1. Also in this example, the nozzle 9c attached to the pump 9b is inserted into the annular-shaped space between the inner ring 3a and the outer ring 3b in the angular ball bearing 3 and is thus opened, thereby dropping the lubricating oil from above the position placed just close to the rolling elements 3c.

FIG. 6 shows the example in which the equivalent oil feeding unit to that in the prior example is incorporated into the housing 1 itself, and the central spacer 5 for the outer ring in the example of FIG. 1 is eliminated and a central part in the axial direction of the housing 1 is protruded to be annular-shaped on an inside in place thereof, and the tank 9a, the pump 9b, the nozzle 9c and the driving circuit (not shown) are incorporated into the protruded portion. These examples in FIGS. 5 and 6 can be used in combination with the example of FIG. 1, and the oil feeding unit for each of the angular ball bearings 3 can be disposed in an optimum position corresponding to the structure of the housing 1.

In the invention, furthermore, it is not necessary to incorporate all the members for constituting the oil feeding unit into an identical member such as a spacer or a cover member. As is illustrated in FIG. 7, it is possible to incorporate only the tank 9a into another member. More specifically, in the example of FIG. 7, the spacer for an outer ring disposed corresponding to each bearing is divided into two parts in the axial direction and the pump 9b, the nozzle 9c and the driving circuit (not shown) are incorporated in a spacer 4a for an outer ring at a side which is adjacent to the bearing, and furthermore, the tank 9a is incorporated in a spacer 4b for an outer ring at the other side and the tank 9a and the pump 9b are caused to communicate with each other through the pipe 9e extended in the axial direction. In this example, there is an advantage that the lubricating oil can be supplied into the tank 9a by removing the spacer 4b for an outer ring which incorporates the tank 9a therein.

While the description has been given to the example in which the invention is applied to the spindle, moreover, it is a matter of course that the invention can be applied to various apparatuses having a rotating shaft other than the spindle and it is apparent that the invention can also be applied to an apparatus using a rolling bearing other than the angular ball bearing. Furthermore, it is apparent that the invention can equally be applied to a rolling bearing using an inner ring as a fixed ring in addition to a rolling bearing using an outer ring as the fixed ring.

Example 2

FIG. 8A is an axial sectional view showing a rolling bearing device according to these proposals and FIG. 9 is a sectional view taken along an X-X line of FIG. 8A. FIG. 10A is a typical sectional view showing a nozzle 109 for lubricant supply provided on an oil feeding unit 110 which is used in the rolling bearing device according to an example 2 of the invention as seen in a radial direction of a bearing and FIG. 10B is a view showing the nozzle 109 seen in a circumferential direction of the bearing.

The rolling bearing device is constituted by an inner ring 101 and an outer ring 102 which serve as raceway members, a plurality of rolling elements (balls 103) disposed in an annular-shaped space S which is formed between opposed surfaces (raceway planes) of these inner and outer rings, and the oil feeding unit 110 for supplying lubricant.

The oil feeding unit 110 includes a pump 105, control means 106 of the pump 105, a tank 107 for storing lubricant and a battery 108, and all of them are disposed to be accommodated in the annular-shaped space S of the bearing. The control means 106, the tank 107 and the battery 8 take a shape of an almost circular arc as seen in an axial direction, and these are coupled to the pump 105, thereby constituting an annular-shaped unit member as a whole. The oil feeding unit 110 is attached to a fixed ring side of the opposed surfaces of the bearing (an inner peripheral surface 102x of the outer ring 102 in this example).

The rolling bearing device according to the example 2 is also constituted by the inner ring 101 and the outer ring 102 which serve as the raceway members, a plurality of balls 103 disposed in the annular-shaped spaces which is formed between the opposed surfaces of the inner and outer rings, and the oil feeding unit 110 for supplying lubricant.

Moreover, the oil feeding unit 110 includes the pump 105, the control means 106 of the pump 105, the tank 107 for storing lubricant and the battery 108, and is attached to the fixed ring side of the opposed surfaces of the bearing (the inner peripheral surface 102x of the outer ring 102), and furthermore, the nozzle 109 having two holes 109y and 109y for discharging the lubricant to a tip portion 109x positioned in the vicinity of rolling elements is provided on an end face at a central side of the bearing in the pump 105.

The rolling bearing device according to the example 2 features that the holes 109y and 109y of the nozzle 109 for discharging the lubricant are formed in the circumferential direction of the bearing, respectively. Moreover, a tip hole 109z of the nozzle directed in an axial direction of the bearing is sealed with a resin member 111.

Also in the rolling bearing device having the structure, in the case in which the bearing is rotated, an air current is generated in a direction shown in an arrow in the drawing (the circumferential direction of the bearing) in the annular-shaped space S by a rolling motion of the balls 103. In the rolling bearing device, however, the holes 109y and 109y are provided in the circumferential direction of the bearing which is the same as the air current so that the air current can pass through an inside of the nozzle 109.

In the rolling bearing device according to the example 2, accordingly, a negative pressure is not generated in the tip portion 109x of the nozzle so that the lubricant can be prevented from flowing out of the pump 105. Also in the case in which a micropump is employed for the pump 105 of the oil feeding unit 110, moreover, it is possible to accurately control the amount of the lubricant to be supplied into the annular-shaped space S.

Although it is the most desirable that the hole 109y to be formed on the nozzle 109 should be provided in the circumferential direction of the bearing as shown in FIG. 11A, the direction of the hole of the nozzle in the invention is not particularly restricted thereto. In the case in which the hole 109y is formed in a direction other than the circumferential direction of the bearing as shown in FIG. 11B, moreover, an angle α formed by a centerline A of the hole and a tangential line L in the circumferential direction of the bearing on a central point O of the nozzle is preferably equal to or smaller than 75 degrees and is more preferably equal to or smaller than 45 degrees. The inventors have confirmed, by an experiment, that the negative pressure is reduced more greatly than in the case in which the hole is formed on the end face of the nozzle if the angle α is equal to or smaller than 75 degrees.

In the example 2, a cage 104 for holding the balls 103 at a predetermined interval in the circumferential direction may be provided as shown in FIG. 8B. In this case, a tip portion 109x of the nozzle 109 is disposed to supply the lubricant to the vicinity of the balls 103 or the cage 104 as shown in FIGS. 10C and 10D.

As shown in FIGS. 8C and 8D, furthermore, the oil feeding unit 110 can also be disposed on a space 400 corresponding to the fixed ring (the outer ring 102 in these examples). Also in this case, the tip portion 109x of the nozzle 109 is disposed to supply the lubricant to the vicinity of the balls 103 as shown in FIGS. 10A and 10B for FIG. 8C and the vicinity of the balls 103 or the cage 104 as shown in FIGS. 10C and 10D for FIG. 8D in the same manner as FIGS. 8A and 8B.

Further, as shown in FIGS. 8E, 8F and 8G, an intermediate member can be disposed between the space 400 and a fixed ring (the outer ring 102 in these examples). The intermediate member functions as a shim. That is, with disposing the intermediate member between the space 400 and the fixed ring, the tip portion of the nozzle for supplying the lubricant can be adjusted to a position suitable for supplying a small amount of lubricant with respect to the ball 103. Incidentally, the intermediate member is preferably formed of steel (SPCC, for example), brass (C-2801P, for example) and stainless (SUS304, for example).

FIG. 8E shows an example in which an annular intermediate member 500 is disposed between the space 400 and the outer ring 402. In this example, the intermediate member has an annular shape. However, the intermediate member may have C shape to make assembly easy.

FIG. 8F shows an example in which three intermediate members are disposed between the space 400 and the outer ring 402 at constant intervals on the circumference. Incidentally, although, in FIG. 8F, three intermediate members are disposed, of course, more than three intermediate members can be disposed. In such a case, the intermediate members are preferably disposed at constant intervals on the circumference.

FIG. 8G shows an example in which three fitting portions (attaching recesses) 405 are formed on the space 400 and the intermediate members 500 are disposed thereto. Incidentally, although the fitting portions are formed on the space, the attaching recesses may be formed on the outer ring 402.

Of course, the structures of FIGS. 8B and 8G can be suitably combined with each other. For example, the feature of the cage of the FIG. 8B can be combined with the examples of FIGS. 8E and 8G.

Needless to say, with the structures of FIGS. 8B, 8C, 8D, 8E, 8F and 8G, same effects as FIG. 8A can be obtained.

Example 3

Next, an example 3 according to the invention will be described.

FIG. 12A is a typical sectional view showing a nozzle 109 for lubricant supply provided in an oil feeding unit 110 which is used in a rolling bearing device according to the example 3 of the invention as seen in a radial direction of a bearing, and FIG. 12B is a view showing the nozzle 109 seen in a circumferential direction of the bearing.

The example 3 is different from the example 2 in that holes 112$y$ and 112$y$ are formed in the circumferential direction of the bearing and a cylindrical member 112 having a tip hole 112$z$ sealed with a resin member 111 is attached to a tip portion 109$x$ of the nozzle 109. These holes 112$y$ are formed by carrying out a wire cut processing over a peripheral surface of the cylindrical member 112.

By this structure, similarly, a negative pressure is not generated in the tip portion 109$x$ of the nozzle and lubricant can be prevented from flowing out of a pump 105 in the same manner as in the example 2. Also in the rolling bearing device according to the example 3, accordingly, the amount of the lubricant to be supplied into an annular-shaped space S of the bearing has no waste. Consequently, it is possible to obtain a rolling bearing device capable of automatically feeding oil for a long period of time.

The number and shape of the holes to be formed in the tip portion of the nozzle and the method of forming them in the invention are not restricted to these examples but a method of sealing the tip of the nozzle is also optional.

In the example 3, a cage 104 for holding balls 103 at a predetermined interval in a circumferential direction may be provided as shown in FIG. 8B. In this case, the tip portion 109$x$ of the nozzle 109 is disposed to supply the lubricant to the vicinity of the balls 103 or the cage 104 as shown in FIGS. 12C and 12D. Also in the example, as shown in FIGS. 8C and 8D, the oil feeding unit 110 can also be disposed on a member 400 adjacent to a fixed ring (an outer ring 402 in these examples). As shown in FIGS. 8E, 8F and 8G, the intermediate member may be disposed between the space 400 and the fixed ring (the outer ring 402 in these examples) also in this embodiment.

Moreover, the structure of the bearing and that of the oil feeding unit are not restricted to these examples but the invention can be widely applied to the rolling bearing device for inserting a lubricant feeding nozzle to the vicinity of rolling elements or the cage and supplying the lubricant by means of a pump.

Example 4

FIG. 13A is a typical sectional view showing a nozzle 109 for lubricant supply provided in an oil feeding unit 110 used in a rolling bearing device according to an example 4 of the invention as seen in a radial direction of a bearing, and FIG. 13B is a view showing the nozzle 9 seen in a circumferential direction of the bearing. Since a whole structure of the rolling bearing device is the same as that in the example 2 shown in FIGS. 8A and 9, detailed description thereof will be omitted.

A rolling bearing device according to the example is also constituted by an inner ring 101 and an outer ring 102 which serve as raceway members, a plurality of balls 103 disposed in an annular-shaped space S which is formed between opposed surfaces of these inner and outer rings, and the oil feeding unit 110 for supplying lubricant.

Moreover, the oil feeding unit 110 includes a pump 105, control means 106 of the pump 105, a tank 107 for storing lubricant and a battery 108 and is attached to a fixed ring side of the opposed surfaces of the bearing (an inner peripheral surface 102$x$ of the outer ring 102), and furthermore, the nozzle 109 having a hole 9$y$ for discharging the lubricant to a tip portion 109$x$ positioned in the vicinity of rolling elements is provided on an end face at a central side of the bearing in the pump 105.

The rolling bearing device according to the example features that an end face of the tip portion 109$x$ of the nozzle is formed in a slant face opened toward an upstream side of an air current generated in the annular-shaped space S by a relative rotation of the inner and outer rings.

Also in the rolling bearing device having the structure, in the case in which the bearing is rotated, an air current is generated in a direction shown in an arrow in the drawing (the circumferential direction of the bearing) in the annular-shaped space S by a rolling motion of the balls 103. In the rolling bearing device, however, the tip of the nozzle 109 is formed in the slant face opposed to the upstream side of the air current. Therefore, the air current hits on an inner peripheral surface 109$z$ of the nozzle 109 so that the lubricant is pressed into a tube of the nozzle 109 by a wind pressure which is generated.

In the rolling bearing device according to the example, accordingly, a negative pressure is not generated in the tip portion 109$x$ of the nozzle so that the lubricant can be prevented from flowing out of the pump 105. Also in the case in which a micropump is employed for the pump 105 of the oil feeding unit 110, moreover, it is possible to accurately control the amount of the lubricant to be supplied into the annular-shaped space S.

It is desirable that the slant face (open surface) should be formed on the tip of the nozzle 109 in such a manner that an angle α formed by a central axis of the nozzle 109 is 10 to 80 degrees. Depending on conditions such as a rotating speed, the inventors have confirmed, by an experiment, that the negative pressure generated in the nozzle tube is almost zero when the angle α is 60 degrees.

In the example 4, a cage 104 for holding the balls 103 at a predetermined interval in the circumferential direction may be provided as shown in FIG. 8B. In this case, the tip portion 109$x$ of the nozzle 109 is disposed to supply the lubricant to the vicinity of the balls 103 or the cage 104 as shown in FIGS. 13C and 13D. Also in the example, as shown in FIGS. 8C and 8D, the oil feeding unit 110 can also be disposed on a member 400 adjacent to a fixed ring (an outer ring 402 in these examples). As shown in FIGS. 8E, 8F and 8G, the intermediate member may be disposed between the space 400 and the fixed ring (the outer ring 402 in these examples) also in this embodiment.

Example 5

Next, an example 5 according to the invention will be described.

FIG. 14A is a typical sectional view showing a nozzle 109 for lubricant supply provided in an oil feeding unit 110 which is used in a rolling bearing device according to the example 5 of the invention as seen in a radial direction of a bearing, and FIG. 14B is a view showing the nozzle 109 seen in a circumferential direction of the bearing.

The example 5 is different from the example 4 in that a member 113 (which will be hereinafter referred to as a "baffle member") for leading an air current generated in an annular-shaped space S by a relative rotation of inner and outer rings toward a hole 109y of the nozzle 109 is provided on a tip portion 109x of the nozzle 109.

The baffle member 113 takes a cylindrical shape in which an inside diameter is almost equal to an outside diameter of the nozzle 109 and an opening on an end is cut obliquely so that an open surface having a hole 113y is formed. Moreover, the baffle member 113 is fixed to the tip portion 109x of the nozzle with an adhesive, for example, with the open surface (slant face) being directed toward an upstream side of the air current generated by the relative rotation of the bearing.

By the structure, similarly, the air current generated by the rotation of the bearing hits on an inner peripheral surface 113z of the baffle member 113 so that lubricant is pressed into the tube of the nozzle 109 by a wind pressure thereof in the same manner as in the example 4. In the rolling bearing device according to the example, accordingly, a negative pressure is not generated in the tip portion 109x of the nozzle but the lubricant can be prevented from flowing out of a pump 105.

In the example 5, a cage 104 for holding balls 103 at a predetermined interval in the circumferential direction may be provided as shown in FIG. 8B. In this case, the tip portion 109x of the nozzle 109 is disposed to supply the lubricant to the vicinity of the balls 103 or the cage 104 as shown in FIGS. 14C and 14D. Also in the example, as shown in FIGS. 8C and 8D, the oil feeding unit 110 can also be disposed on a member 400 adjacent to a fixed ring (an outer ring 402 in these examples). As shown in FIGS. 8E, 8F and 8G, the intermediate member may be disposed between the space 400 and the fixed ring (the outer ring 402 in these examples) also in this embodiment.

Example 6

In the invention, the shape of the baffle member provided on the tip portion 109x of the nozzle 109 is not restricted to the example. Moreover, the opening does not need to be the slant face but a baffle member 114 taking a shape according to an example 6 shown in FIG. 15 may be provided, for example. The baffle member 114 takes a cylindrical shape in which an inner diameter is almost equal to the outside diameter of the nozzle 109 and an opening on one end is cut rectangularly so that an open face having a hole 114y is formed. Furthermore, the baffle member 114 is fixed to the tip portion 109x of the nozzle with an adhesive, for example, with the open surface directed toward an upstream side of an air current generated by the relative rotation of the bearing. By the baffle member 114, similarly, the air current hits on an inner peripheral surface 114z which is exposed so that the same advantages as those in the example 5 can be produced.

In the example 6, a cage 104 for holding balls 103 at a predetermined interval in the circumferential direction may be provided as shown in FIG. 8B. In this case, the tip portion 109x of the nozzle 109 is disposed to supply the lubricant to the vicinity of the balls 103 or the cage 104 as shown in FIGS. 15C and 15D. Also in the example, as shown in FIGS. 8C and 8D, an oil feeding unit 110 can also be disposed on a member 400 adjacent to a fixed ring (an outer ring 402 in these examples). As shown in FIGS. 8E, 8F and 8G, the intermediate member may be disposed between the space 400 and the fixed ring (the outer ring 402 in these examples) also in this embodiment.

Example 7

FIG. 16A is a typical sectional view showing a nozzle for lubricant supply provided in an oil feeding unit 10 used in a rolling bearing device according to an example 7 of the invention as seen in a radial direction of a bearing, and FIG. 16B is a view showing the nozzle seen in a circumferential direction of the bearing. Since a whole structure of the rolling bearing device is the same as that in the example 2 shown in FIGS. 8 and 9, detailed description thereof will be omitted.

A rolling bearing device according to the example is also constituted by an inner ring 1 and an outer ring 2 which serve as raceway members, a plurality of balls 103 disposed in an annular-shaped space S which is formed between opposed surfaces of these inner and outer rings, a cage 4 for holding these balls 103 at a predetermined interval in a circumferential direction, and an oil feeding unit 110 for supplying lubricant.

Moreover, the oil feeding unit 110 includes a pump 105, control means 106 of the pump 105, a tank 107 for storing lubricant and a battery 108 and is attached to a fixed ring side of the opposed surfaces of the bearing (an inner peripheral surface 2x of the outer ring 2), and furthermore, a nozzle 211 provided with a hole 211c for discharging lubricant in a tip portion 211a is disposed on an end face at a central side of the bearing of the pump 105.

The rolling bearing device according to the example features that a large diameter portion 211d having a larger diameter than diameters of the other portions is formed in the tip portion 211a of the nozzle 211 for supplying lubricant O.

Also in the rolling bearing device having the structure, in the case in which the bearing is rotated, an air current is generated in a direction (a circumferential direction of the bearing) shown in an arrow in the drawing in the annular-shaped space S by a rolling motion of the balls 103. In the rolling bearing device, however, the large diameter portion 211d to be lubricant holding portion is formed on the tip of the nozzle 211. Therefore, the lubricant O which is discharged is not moved in a direction of a base portion 211b of the nozzle but is collected as oil drops vertically and downward from the large diameter portion 211d.

In the rolling bearing device according to the example, accordingly, the discharged lubricant O can be stably dropped into the vicinity of the balls 103 or the vicinity of the cage 4 at the highest efficiency. Moreover, the lubricant to be supplied has no waste so that it is possible to maintain an excellent bearing lubrication with a small amount of the lubricant.

The lubricant holding portion (the large diameter portion 211d) provided on the tip of the nozzle 211 does not need to be formed uniformly in the circumferential direction of the nozzle 211 but may take any shape swollen (protruded) at least vertically and downward in the bearing.

In the example 7, a cage 104 for holding the balls 103 at a predetermined interval in the circumferential direction may be provided as shown in FIG. 8B. In this case, a tip portion 109x of a nozzle 109 is disposed to supply the lubricant to the vicinity of the balls 103 or the cage 104 as shown in FIGS. 16C and 16D. Also in the example, as shown in FIGS. 8C and 8D, the oil feeding unit 110 can also be disposed on a member 400 adjacent to a fixed ring (an outer ring 402 in these examples). As shown in FIGS. 8E, 8F and 8G, the intermediate member may be disposed between the space 400 and the fixed ring (the outer ring 402 in these examples) also in this embodiment.

Examples 8 and 9

Next, examples 8 and 9 according to the invention will be described.

FIGS. 17A and 18A are typical sectional views showing a nozzle for lubricant supply provided in an oil feeding unit 10 used in a rolling bearing device according to examples 8 and 9 of the invention as seen in a radial direction of a bearing, and FIGS. 17B and 18B are views showing the nozzle seen in a circumferential direction of the bearing.

The example 8 is different from the example 7 in that a lubricant holding portion for collecting the discharged lubricant as an oil drop is formed by setting an opening diameter of a hole 12*c* on a tip of the nozzle to be larger than a diameter of an inner peripheral surface 12*y* in the other portions.

In the example 9, moreover, the lubricant holding portion is formed by means of an annular-shaped member 213 fitted on a nozzle tip portion 109*x*. The annular-shaped member 213 is fixed to an outer peripheral surface 109*a* of a nozzle 109 with an adhesive, for example.

By these structures, similarly, the lubricant discharged from a pump 105 is collected as an oil drop vertically and downward from the lubricant holding portion (the nozzle tip portion 109*x* or the annular-shaped member 213) and is not moved in a direction of a base portion of the nozzle. Accordingly, the rolling bearing devices according to these examples can also stably drop the discharged lubricant into the vicinity of balls 103. Moreover, the lubricant to be supplied has no waste and an excellent bearing lubrication can also be maintained with a small amount of the lubricant.

In the examples 8 and 9, a cage 104 for holding the balls 103 at a predetermined interval in the circumferential direction may be provided as shown in FIG. 8B. In this case, the tip portion 109*x* of the nozzle 109 is disposed to supply the lubricant to the vicinity of the balls 103 or the cage 104 as shown in FIGS. 17C, 17D, 18C and 18D. Also in these examples, as shown in FIGS. 8C and 8D, an oil feeding unit 110 can also be disposed on a member 400 adjacent to a fixed ring (an outer ring 402 in these examples). As shown in FIGS. 8E, 8F and 8G, the intermediate member may be disposed between the space 400 and the fixed ring (the outer ring 402 in these examples) also in this embodiment.

Also in these examples, the lubricant holding portion provided on the tip of the nozzle does not need to be formed uniformly in the circumferential direction of the nozzle but preferably takes any shape protruded at least vertically and downward in the bearing. For instance, an opening shape of a tip portion 109*z* according to the example 8 may include a shape of a petal and a shape of a star in the circumferential direction of the nozzle in addition to a shape of a trumpet which is illustrated.

Moreover, the structure of the bearing and that of the oil feeding unit are not restricted to those of the examples 2 to 9 but the invention can be widely applied to a rolling bearing device for inserting the lubricant feeding nozzle to the vicinity of the rolling elements or the cage and supplying lubricant by means of a pump.

Figure 1:
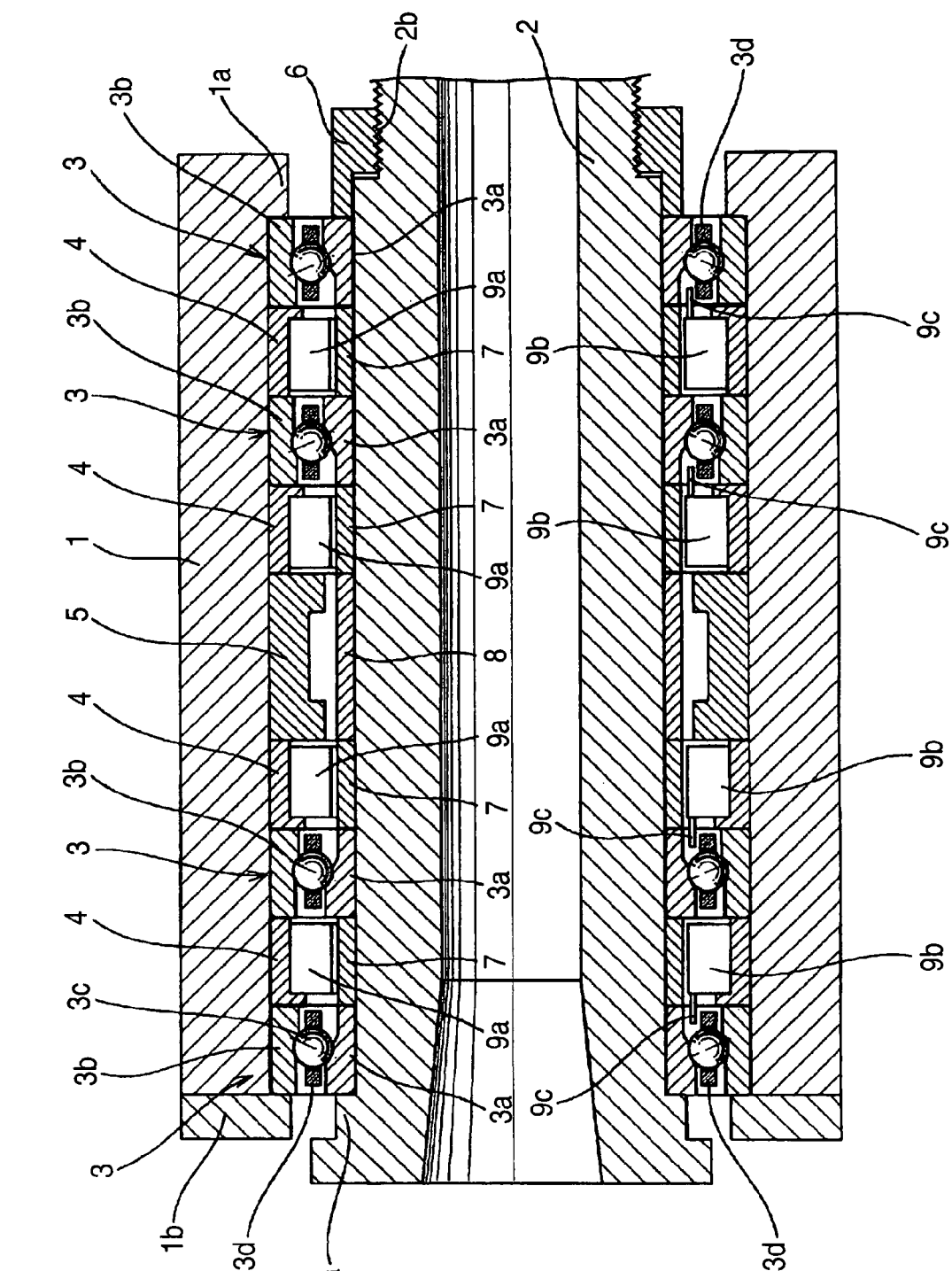
FIG. 1 is an axial sectional view showing a structure of a spindle according to an example 1 of the invention.
Figure 2:
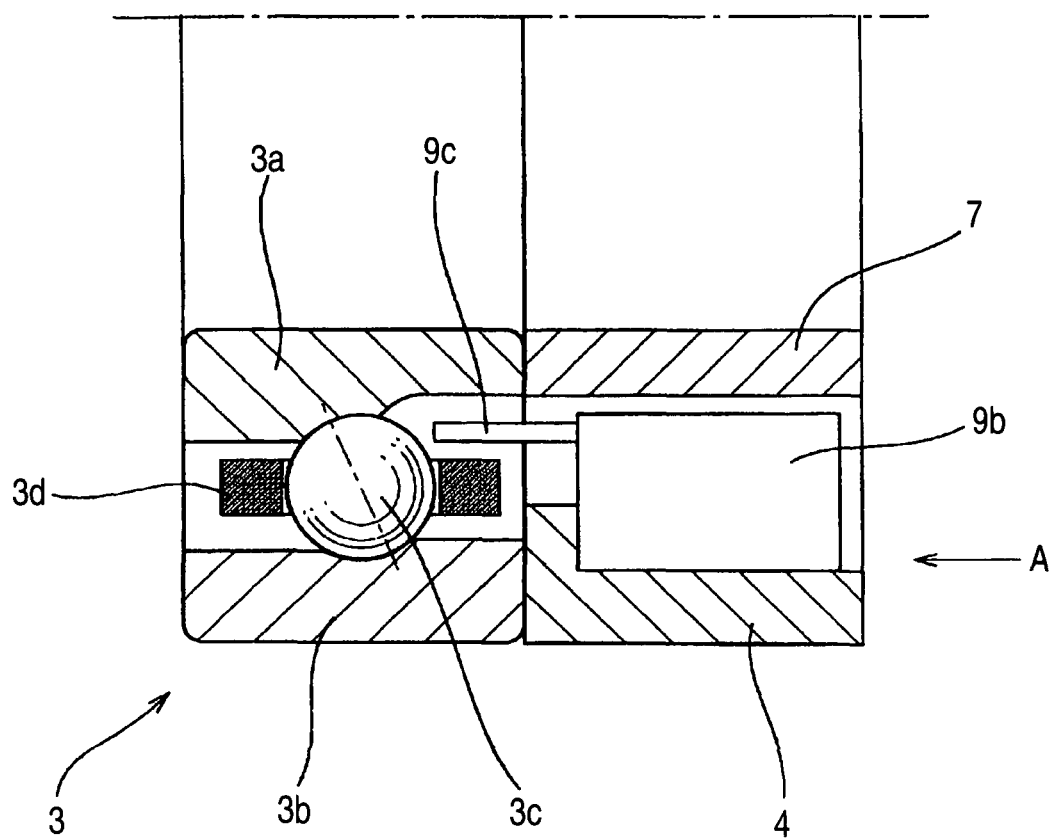
FIG. 2 is an enlarged view showing a main part in FIG. 1.
Figure 3:
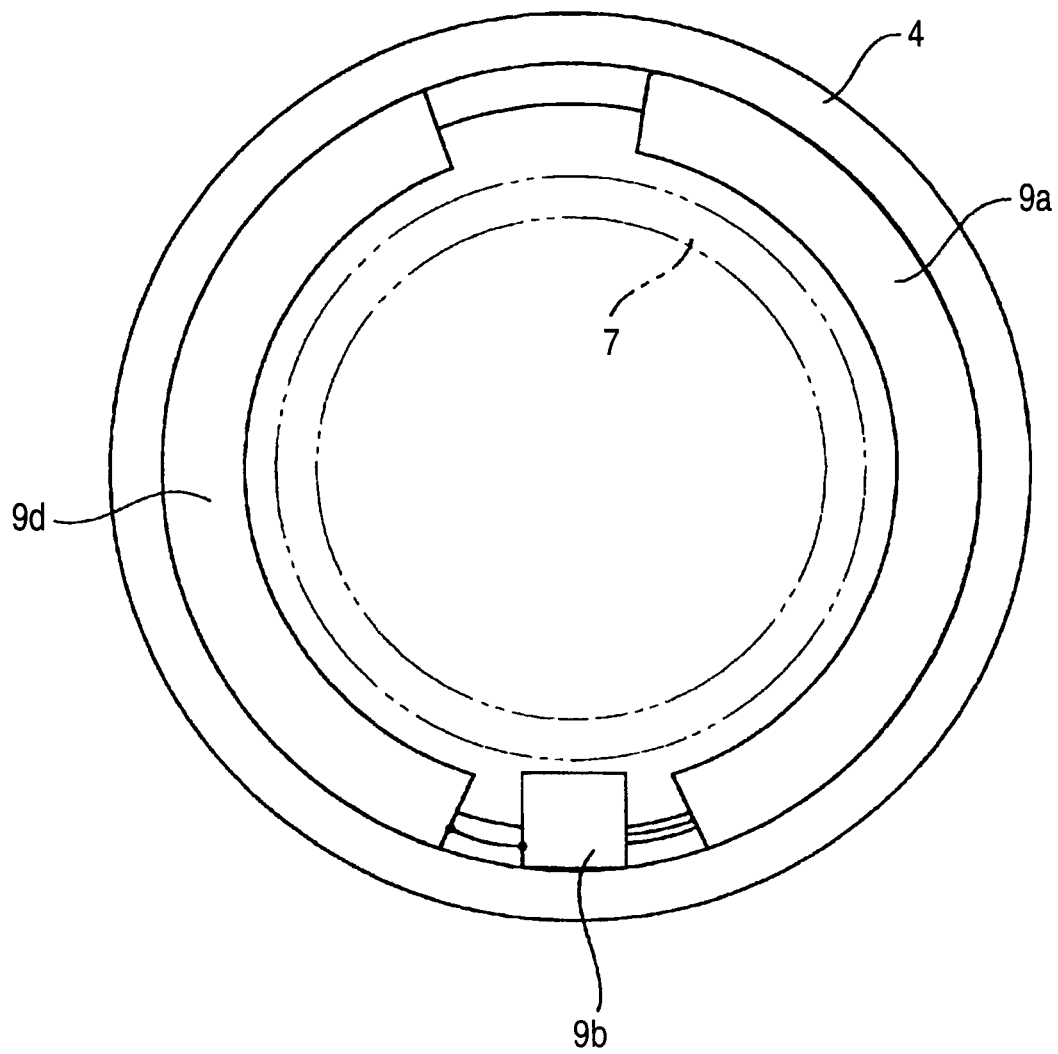
FIG. 3 is a front view showing a spacer 4 for an outer ring according to the example 1 of the invention as seen in a direction shown in an arrow A of FIG. 2.
Figure 4:
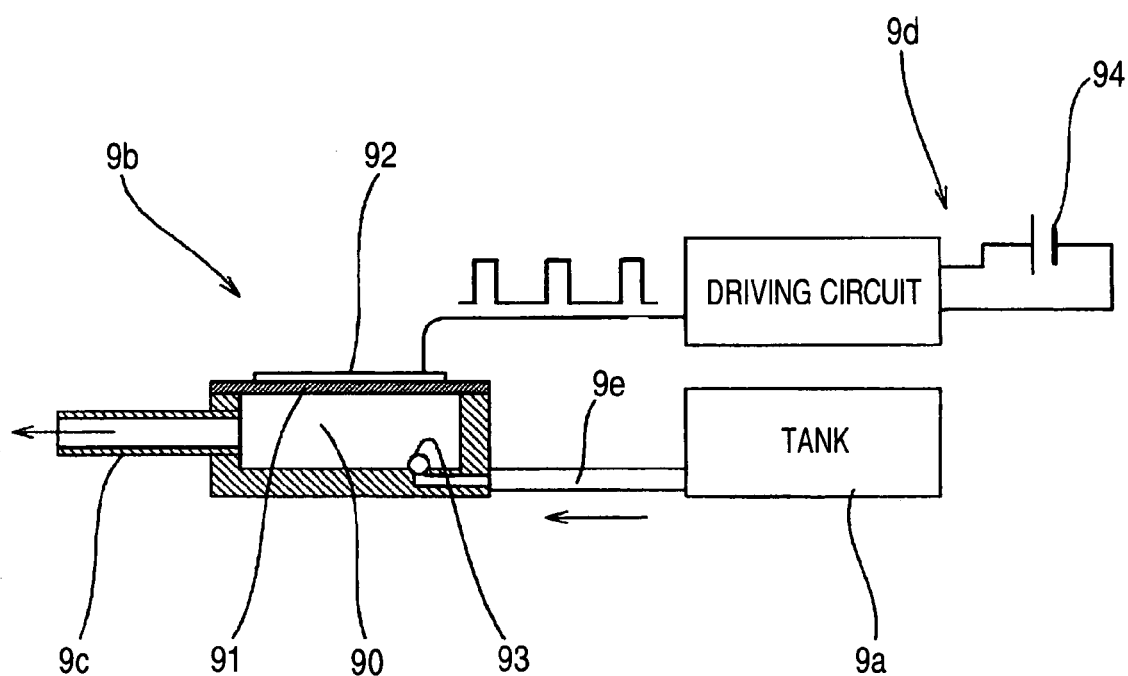
FIG. 4 is a view showing a whole structure of an oil feeding unit used in the example 1 according to the invention, including a typical view illustrating a mechanical structure and a block diagram illustrating an electrical structure together.
Figure 5:
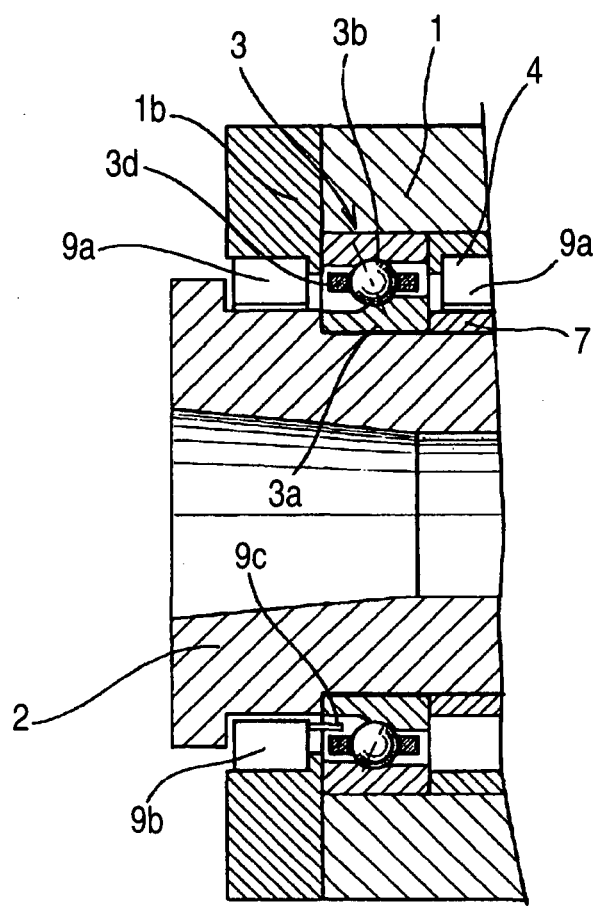
FIG. 5 is an axial sectional view showing a main part according to a variant of the first example in accordance with the invention.
Figure 6:
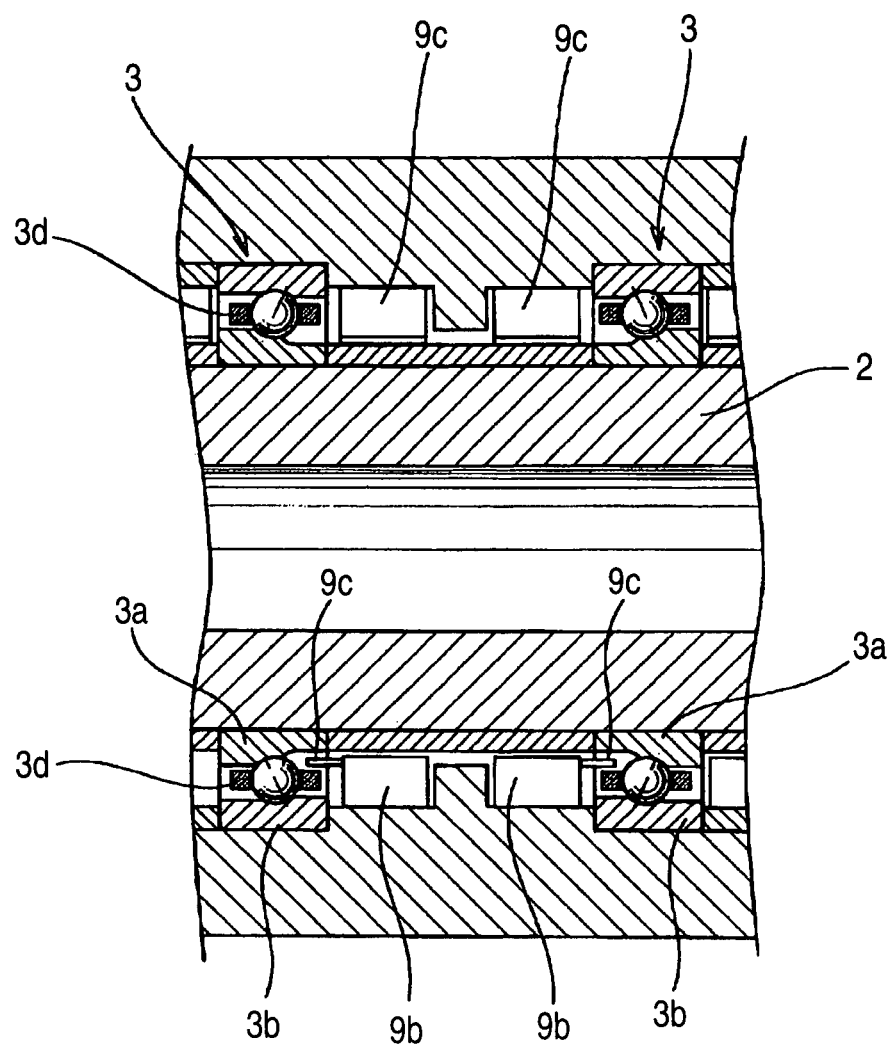
FIG. 6 is an axial sectional view showing a main part according to another variant of the first example in accordance with the invention.
Figure 7:
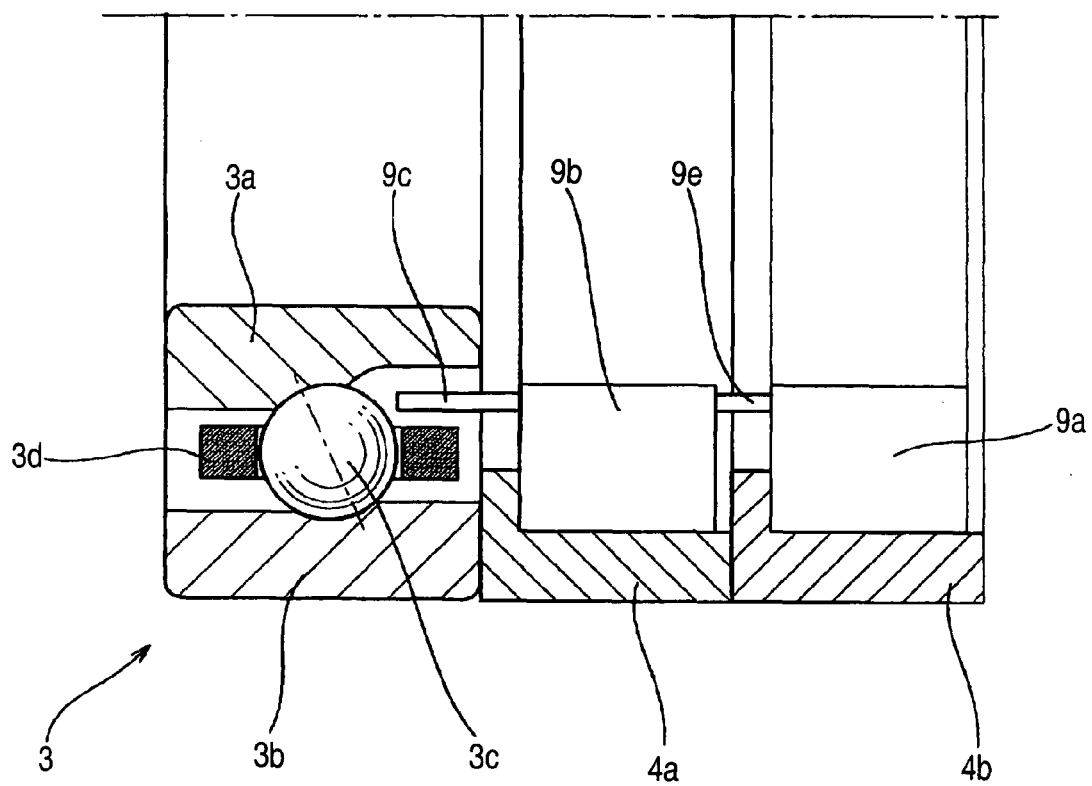
FIG. 7 is an axial sectional view showing a structure of a main part according to a further variant of the first example in accordance with the invention.
Figure 8A:
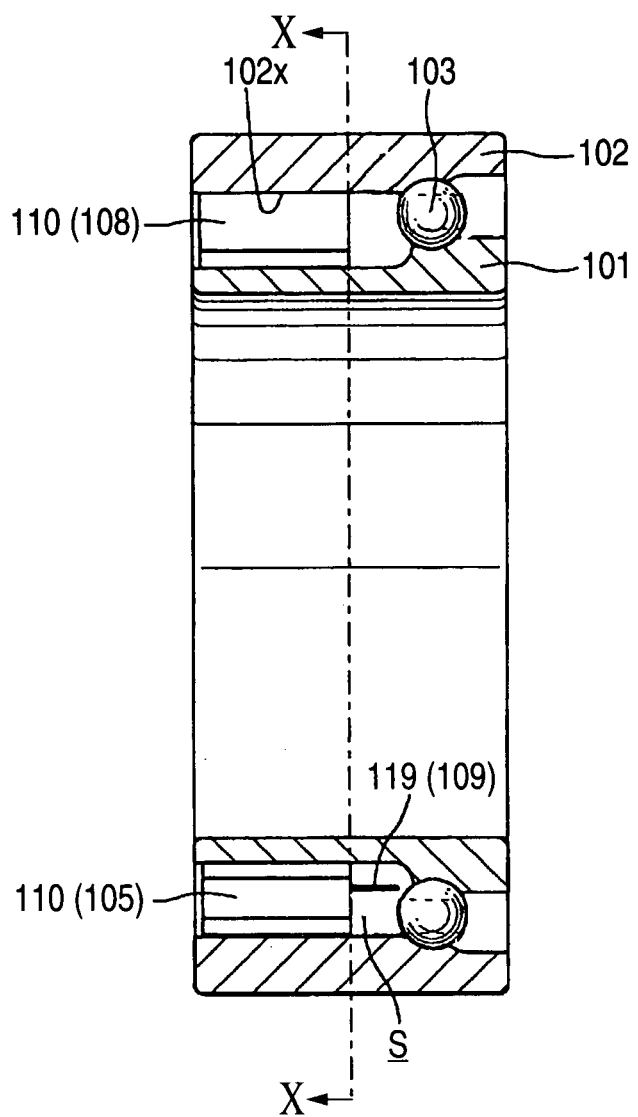
FIG. 8A is a sectional view in an axial direction, illustrating an example of a structure of a rolling bearing device comprising an oil feeding unit.
Figure 8B:
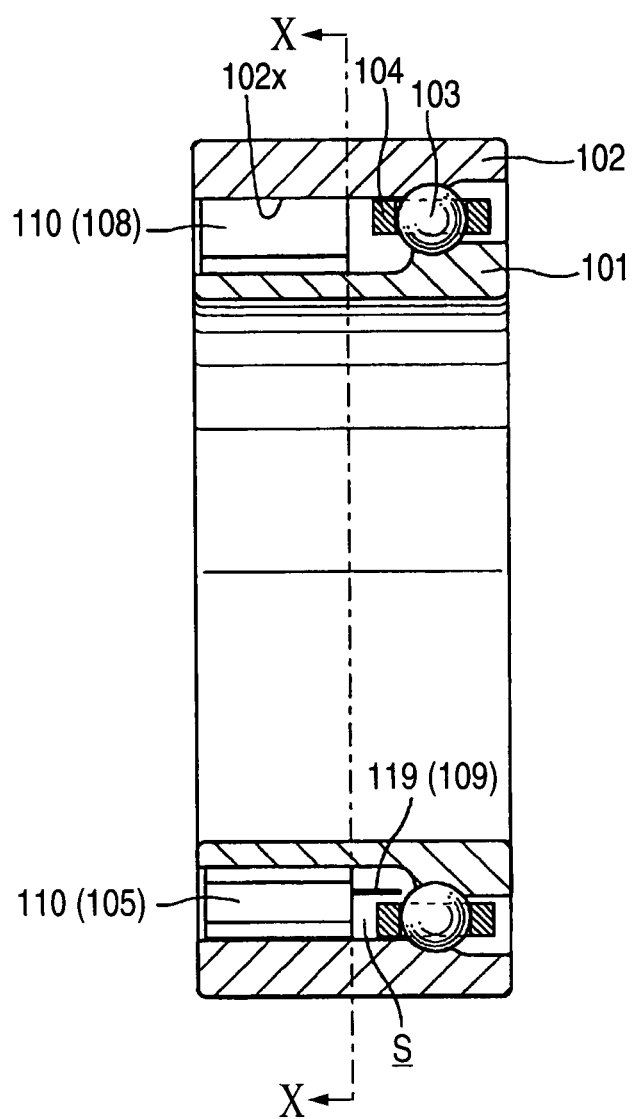
FIG. 8B is a sectional view in an axial direction, illustrating a variant of the rolling bearing device comprising the oil feeding unit.
Figure 8C:
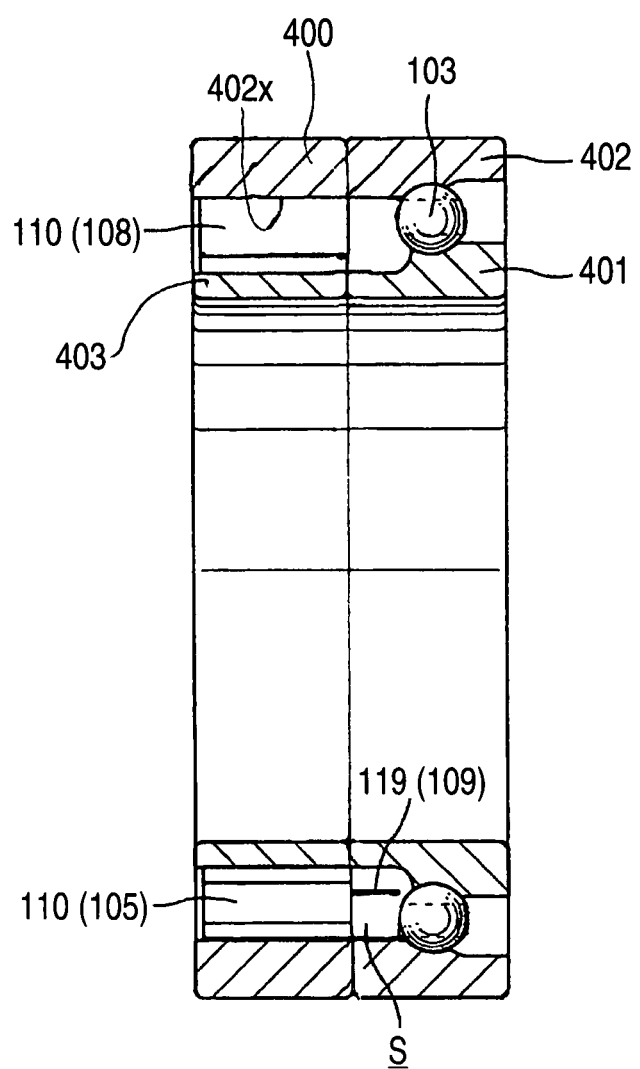
FIG. 8C is a sectional view in an axial direction, illustrating a variant of the rolling bearing device comprising the oil feeding unit.
Figure 8D:
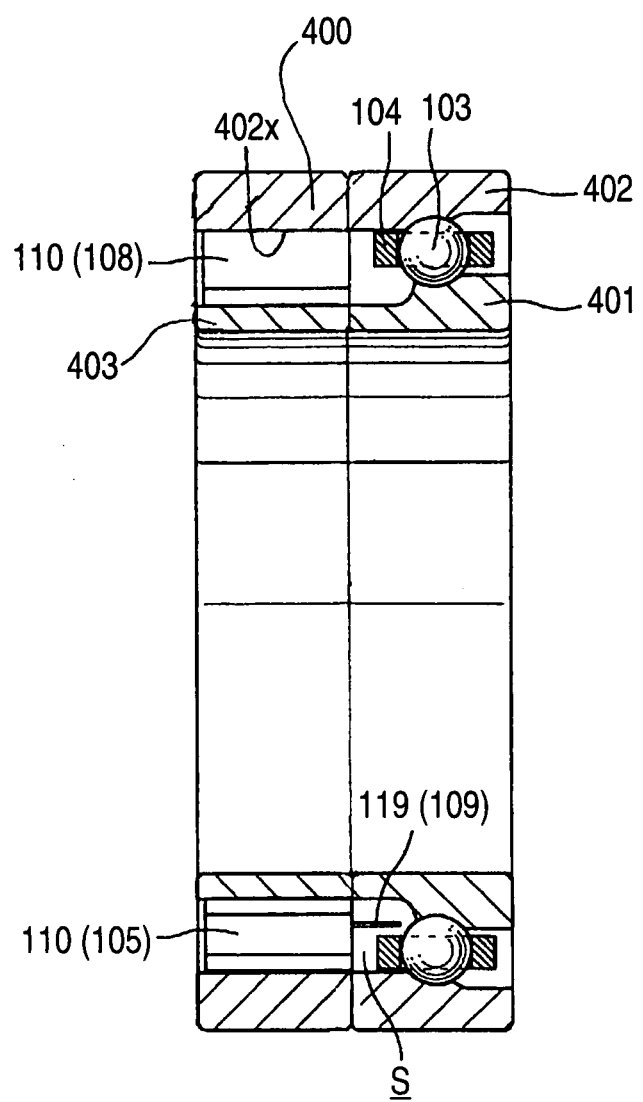
FIG. 8D is a sectional view in an axial direction, illustrating a variant of the rolling bearing device comprising the oil feeding unit.
Figure 8E:
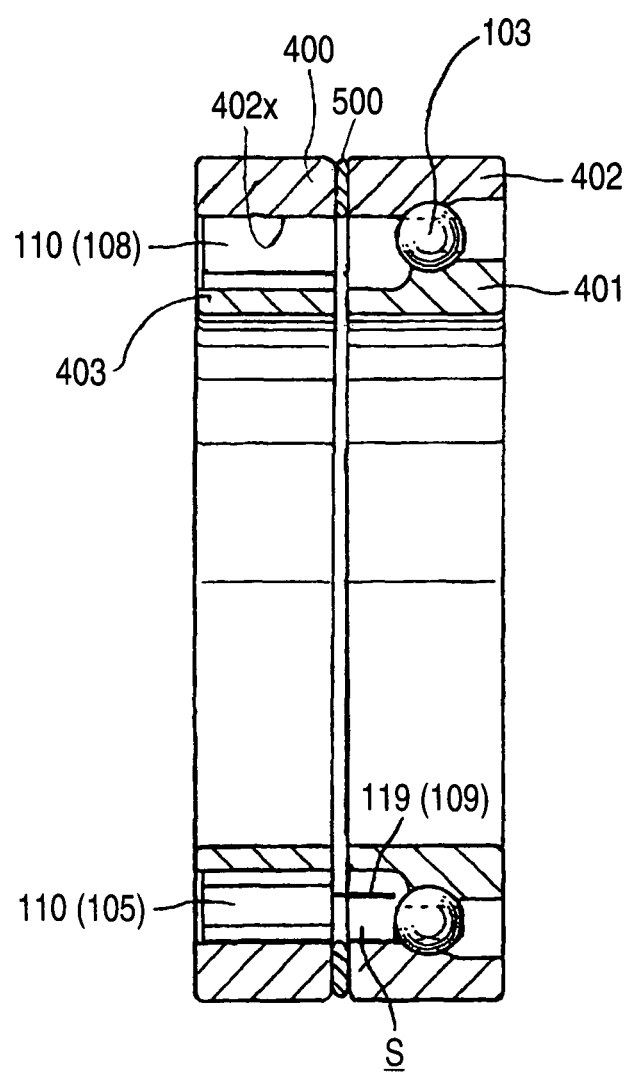
FIG. 8E is a sectional view in an axial direction, illustrating a variant of the rolling bearing device comprising the oil feeding unit.
Figure 8F:
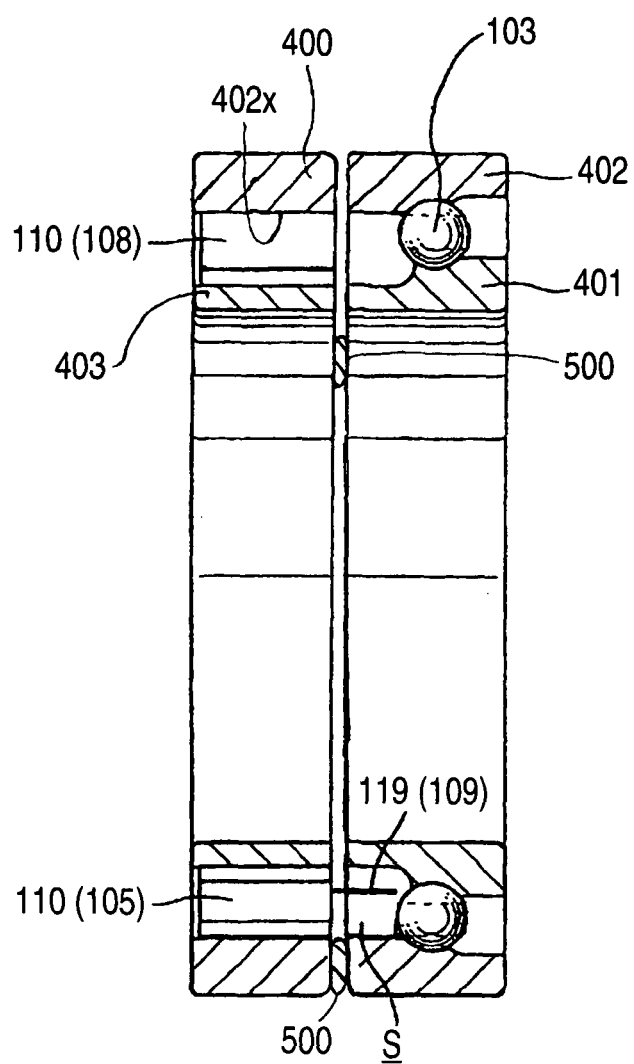
FIG. 8F is a sectional view in an axial direction, illustrating a variant of the rolling bearing device comprising the oil feeding unit.
Figure 8G:
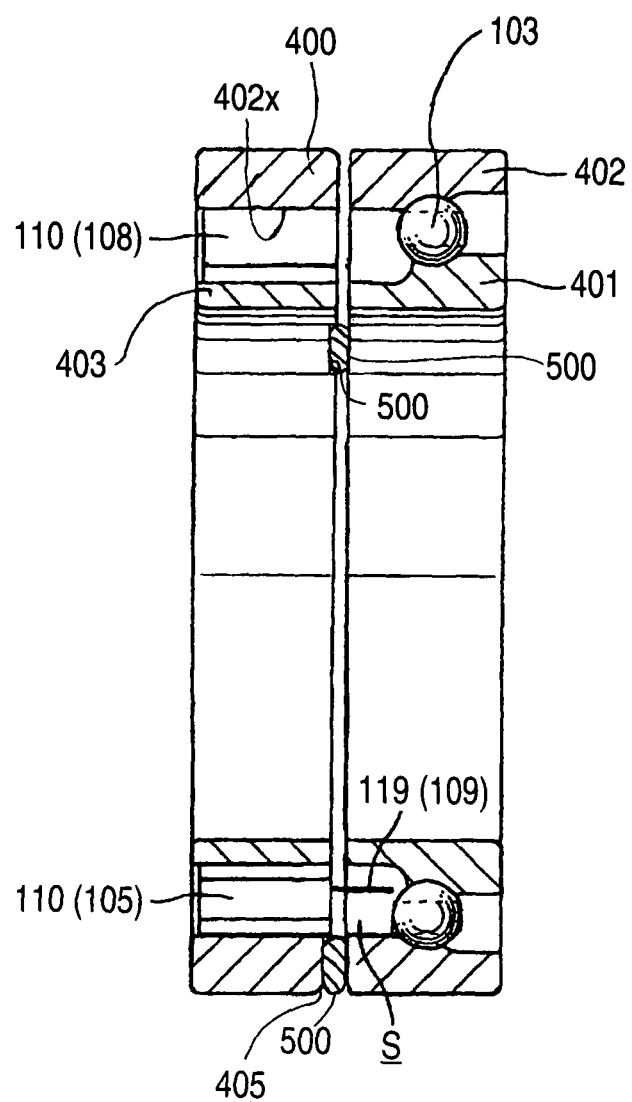
FIG. 8G is a sectional view in an axial direction, illustrating a variant of the rolling bearing device comprising the oil feeding unit.
Figure 9:
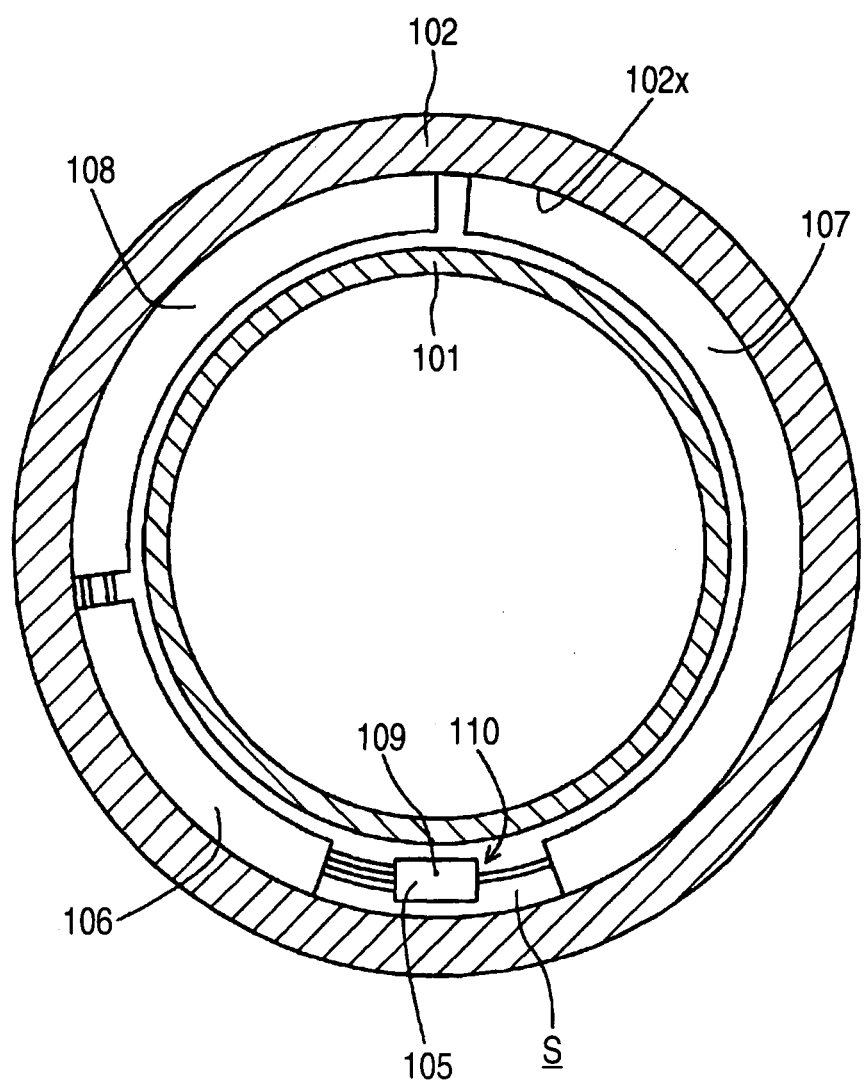
FIG. 9 is a sectional view taken along an X-X line in FIG. 8.
Figure 10A:
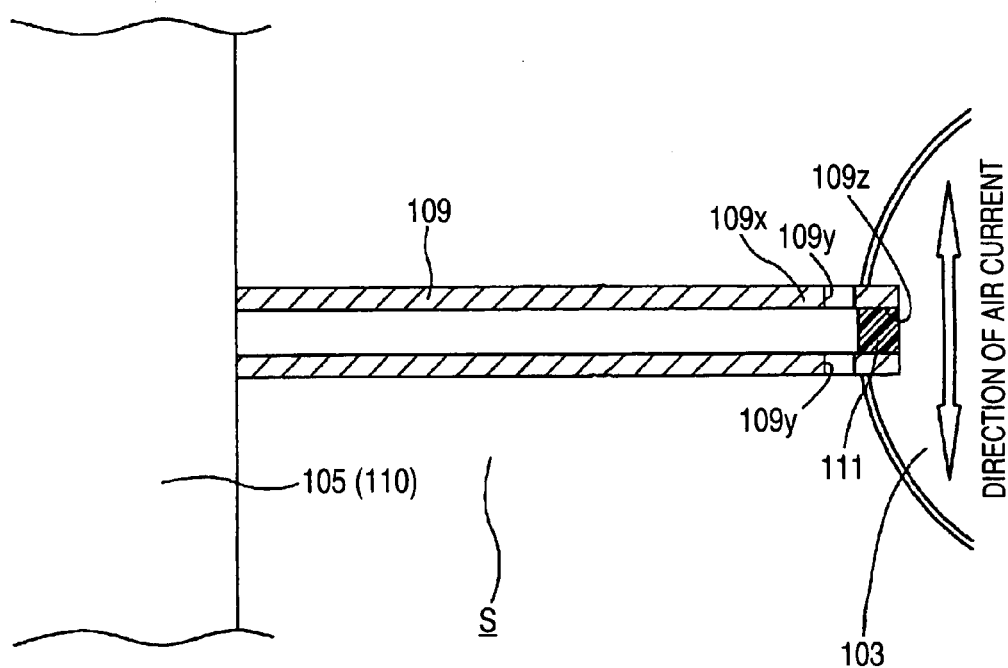
FIG. 10A is a view showing a nozzle for lubricant supply provided in an oil feeding unit used in a rolling bearing device according to an example 2 of the invention as seen in a radial direction of a bearing.
Figure 10B:
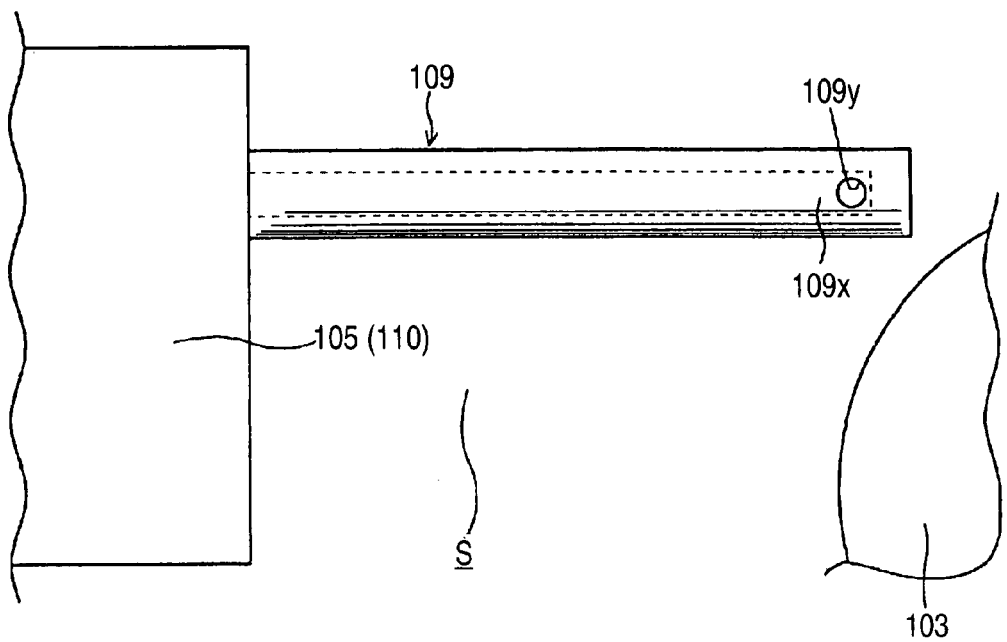
FIG. 10B is a view showing the nozzle in FIG. 10A as seen in a circumferential direction of the bearing.
Figure 10C:
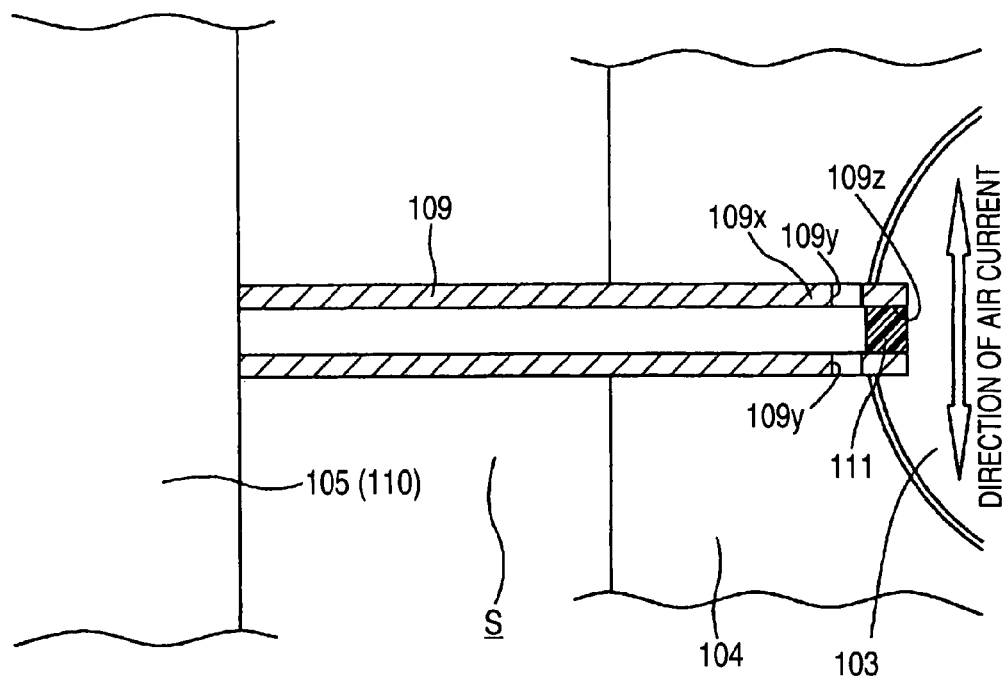
FIG. 10C is a view showing a nozzle for lubricant supply provided in an oil feeding unit used in a rolling bearing device according to a variant of the example 2 in accordance with the invention as seen in the radial direction of the bearing.
Figure 10D:
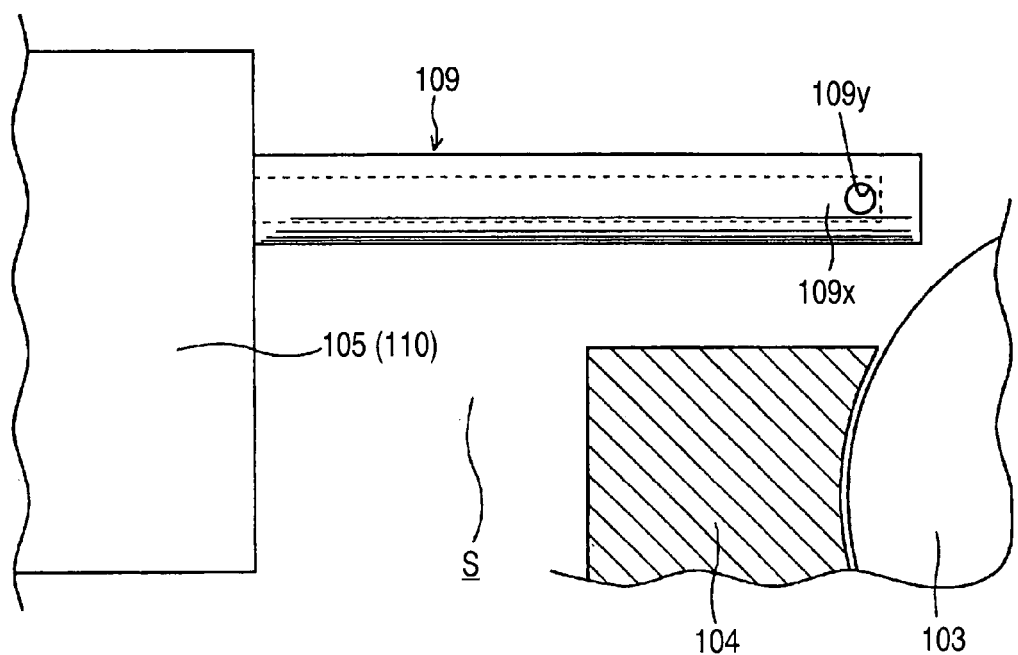
FIG. 10D is a view showing the nozzle in FIG. 10C as seen in the circumferential direction of the bearing.
Figure 11A:
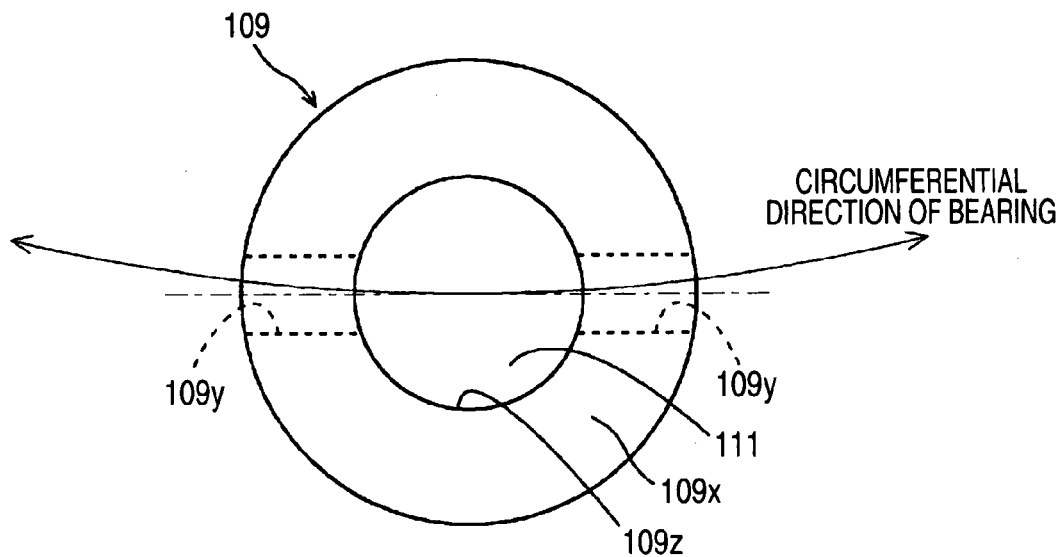
FIG. 11A is a view showing a nozzle for lubricant supply according to an embodiment of the invention as seen in an axial direction of a bearing.
Figure 11B:
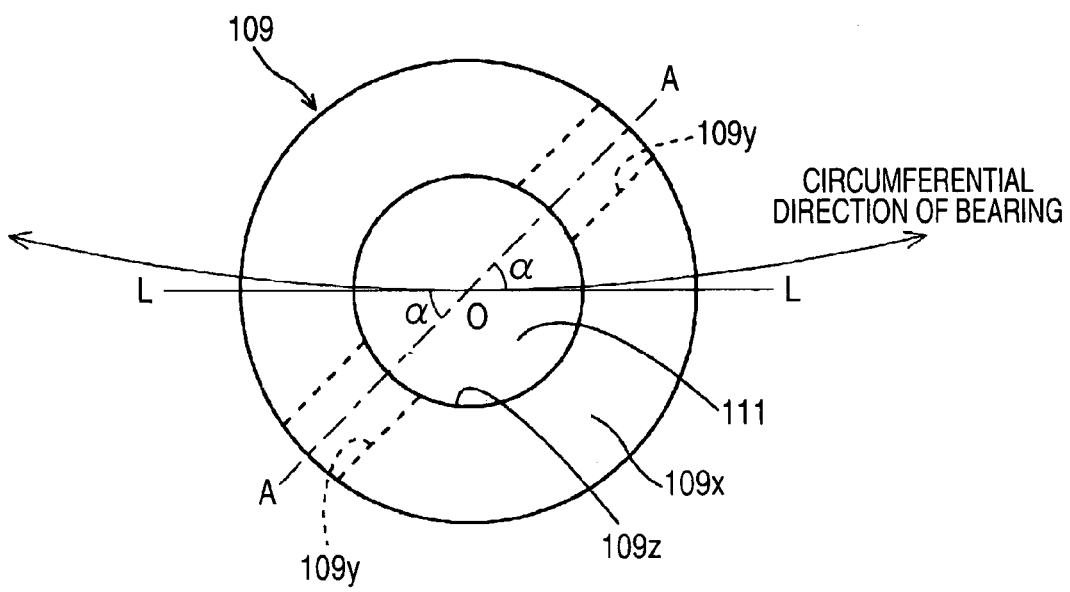
FIG. 11B is a view for explaining a direction of a hole formed on the nozzle in FIG. 11A.
Figure 12A:
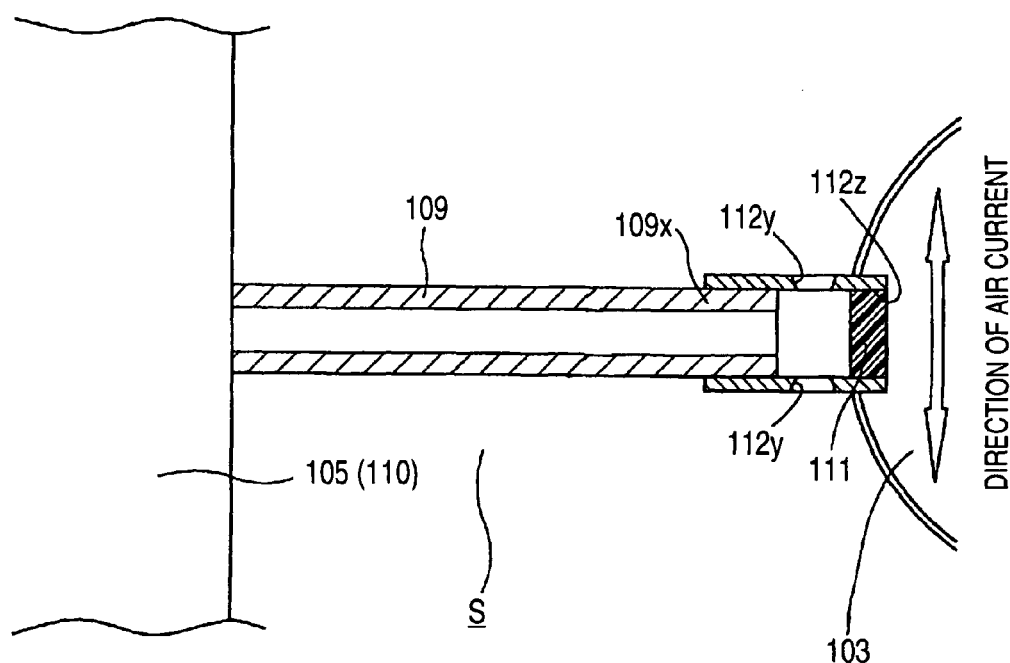
FIG. 12A is a view showing a nozzle for lubricant supply provided in an oil feeding unit used in a rolling bearing device according to an example 3 of the invention as seen in a radial direction of the bearing.
Figure 12B:
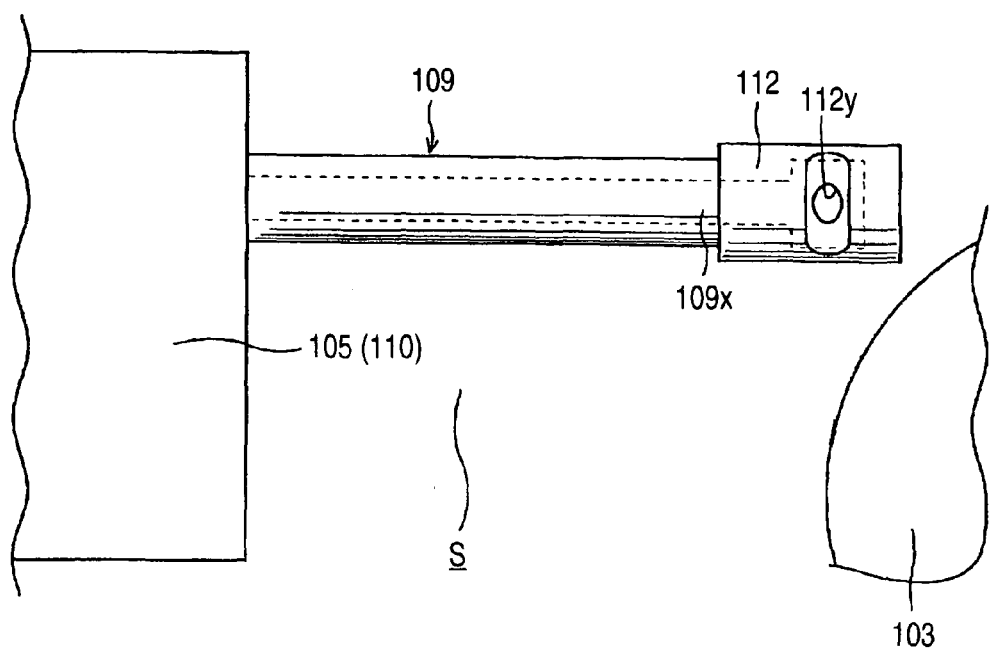
FIG. 12B is a view showing the nozzle in FIG. 12A as seen in a circumferential direction of the bearing.
Figure 12C:
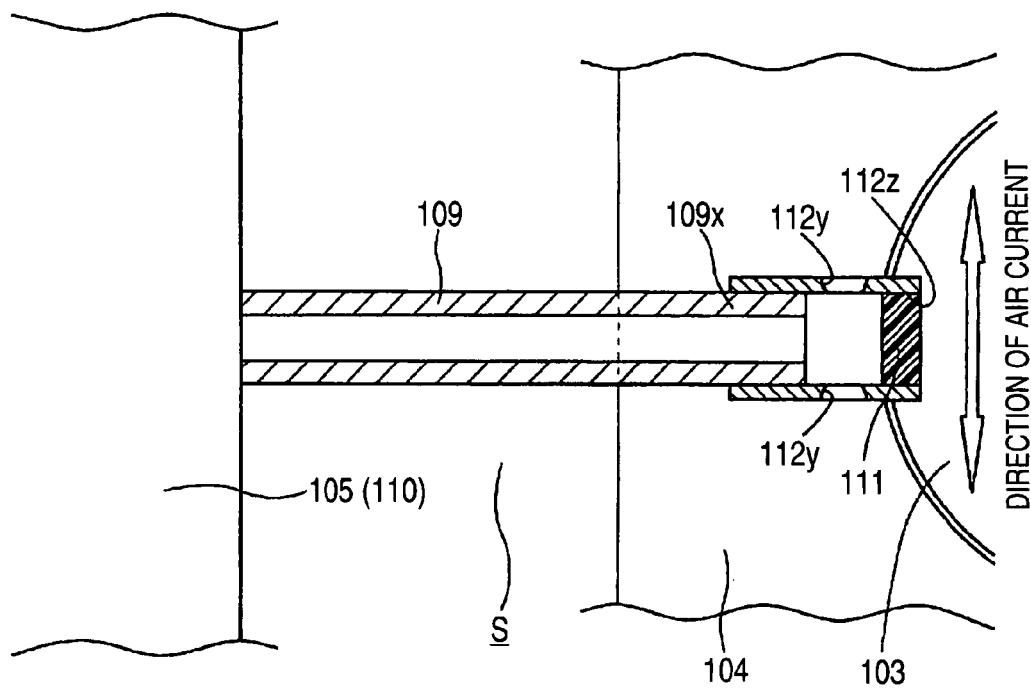
FIG. 12C is a view showing a nozzle for lubricant supply provided in an oil feeding unit used in a rolling bearing device according to a variant of the example 3 in accordance with the invention as seen in the radial direction of the bearing.
Figure 12D:
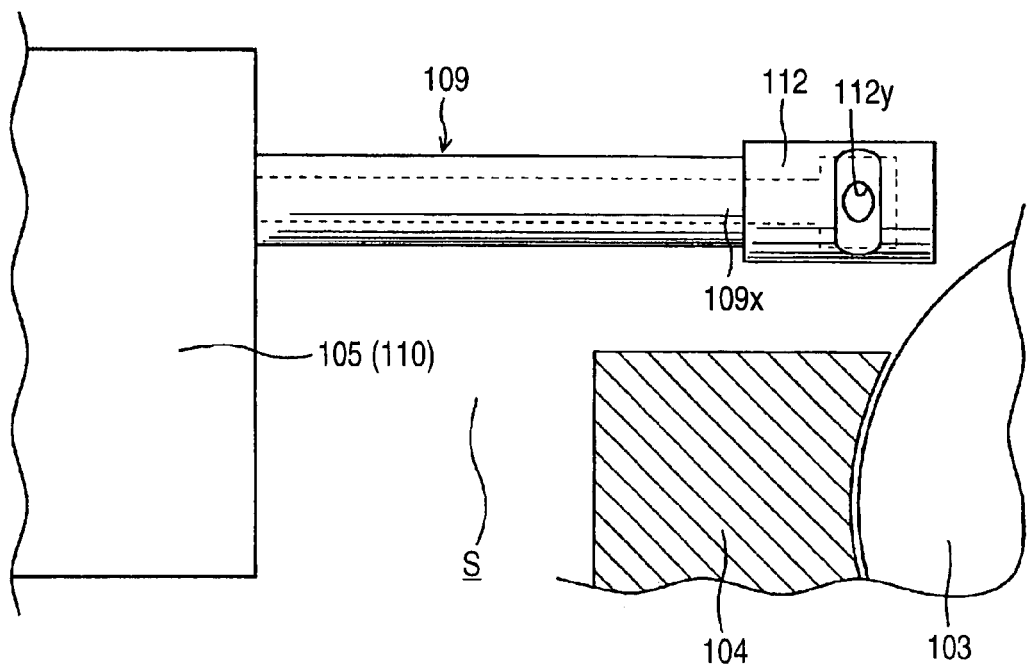
FIG. 12D is a view showing the nozzle in FIG. 12C as seen in the circumferential direction of the bearing.
Figure 13A:
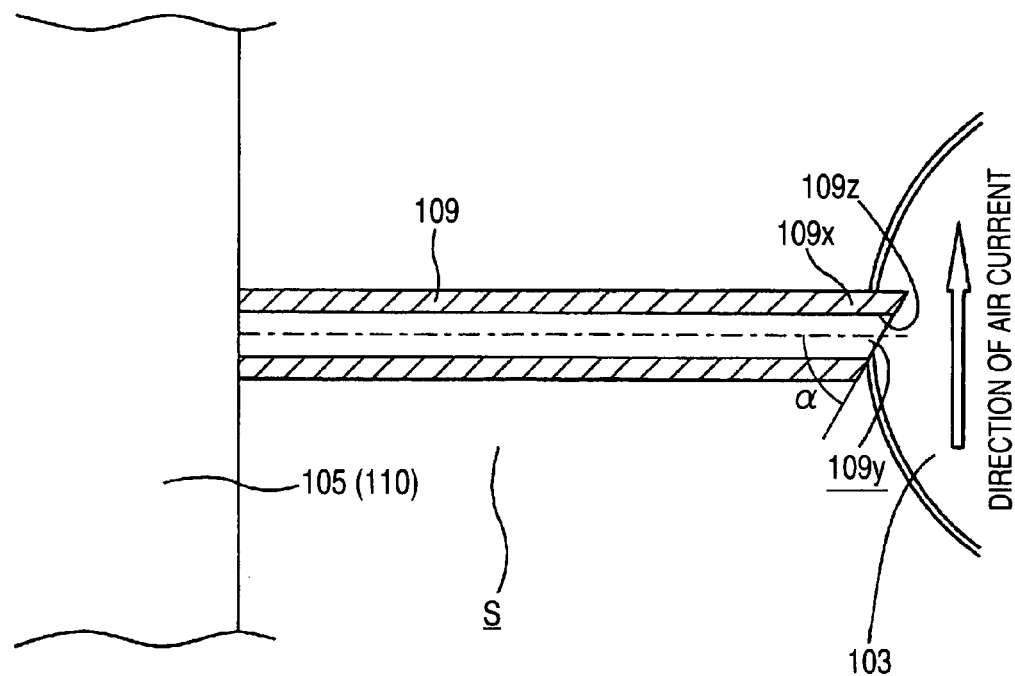
FIG. 13A is a view showing a nozzle for lubricant supply provided in an oil feeding unit used in a rolling bearing device according to an example 4 of the invention as seen in the radial direction of the bearing.
Figure 13B:
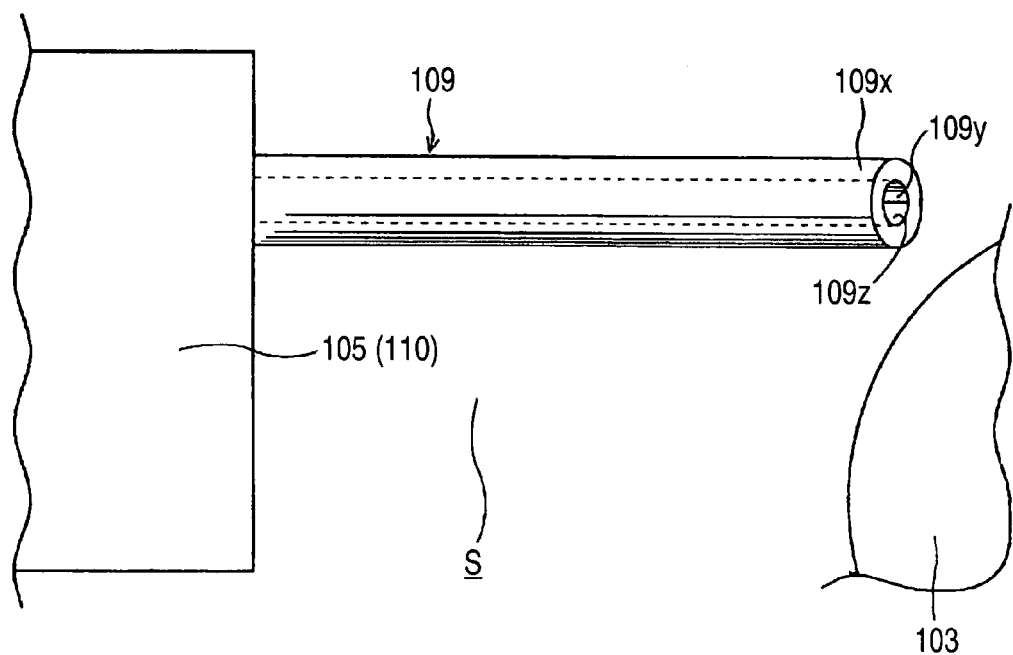
FIG. 13B is a view showing the nozzle in FIG. 13A as seen in the circumferential direction of the bearing.
Figure 13C:
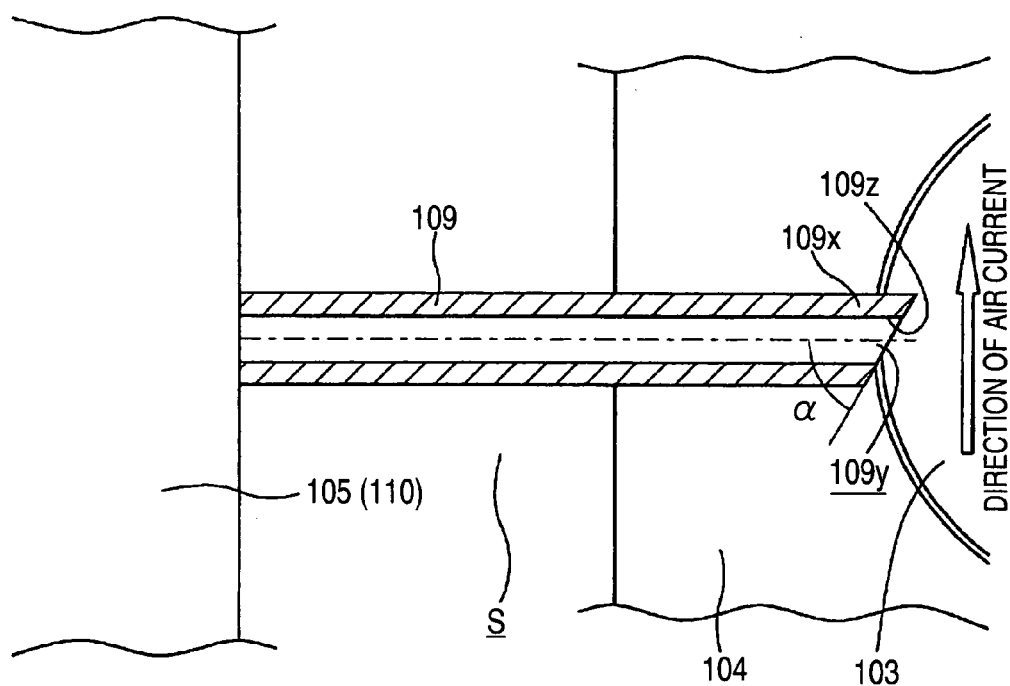
FIG. 13C is a view showing a nozzle for lubricant supply provided in the oil feeding unit used in the rolling bearing device according to a variant of the example 4 in accordance with the invention as seen in the radial direction of the bearing.
Figure 13D:
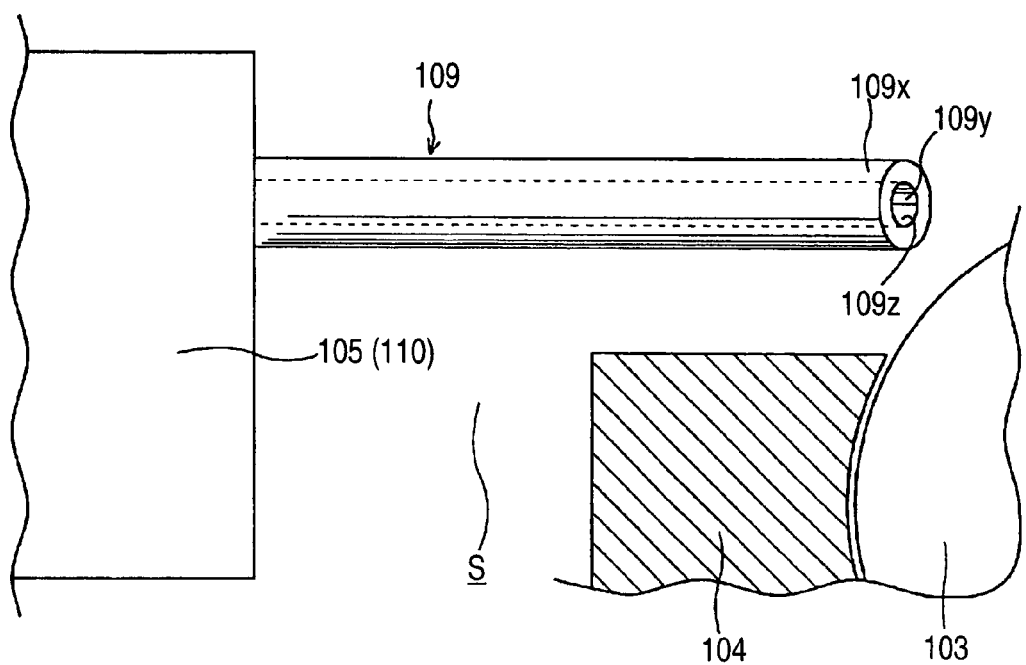
FIG. 13D is a view showing the nozzle in FIG. 13C as seen in the circumferential direction of the bearing.
Figure 14A:
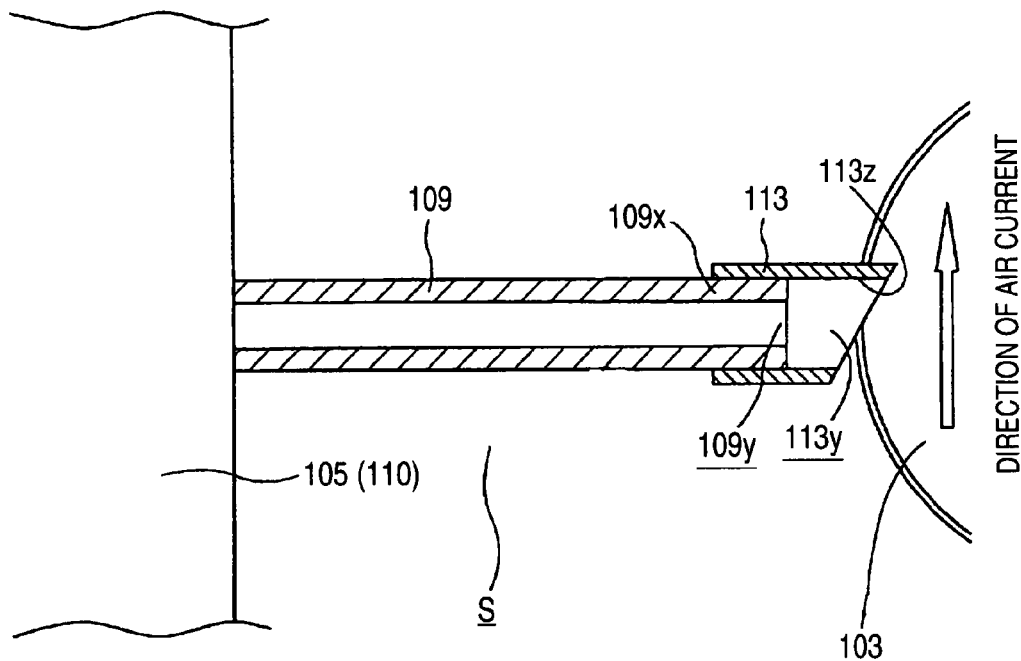
FIG. 14A is a view showing a nozzle for lubricant supply provided in an oil feeding unit used in the rolling bearing device according to an example 5 of the invention as seen in the radial direction of the bearing.
Figure 14B:
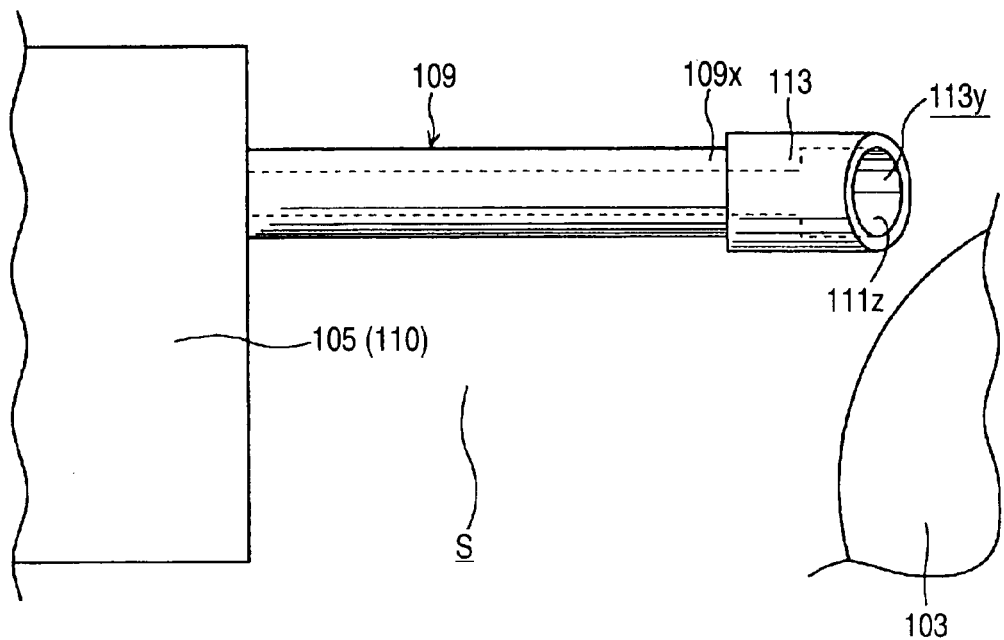
FIG. 14B is a view showing the nozzle in FIG. 14A as seen in the circumferential direction of the bearing.
Figure 14C:
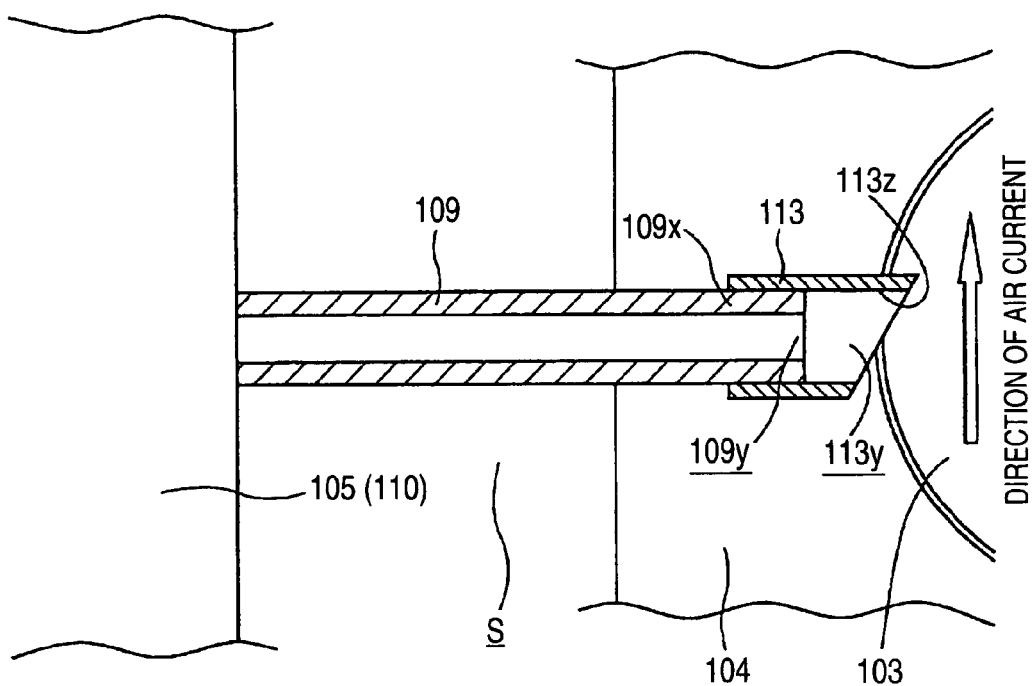
FIG. 14C is a view showing a nozzle for lubricant supply provided in an oil feeding unit used in a rolling bearing device according to a variant of the example 5 in accordance with the invention as seen in the radial direction of the bearing.
Figure 14D:
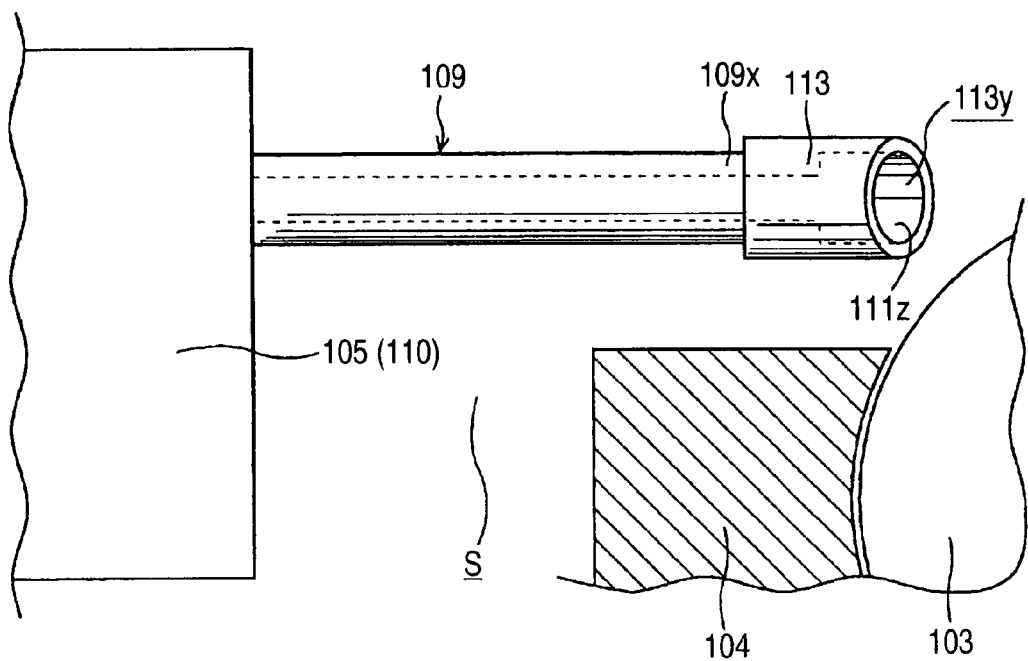
FIG. 14D is a view showing the nozzle in FIG. 14C as seen in the circumferential direction of the bearing.
Figure 15A:
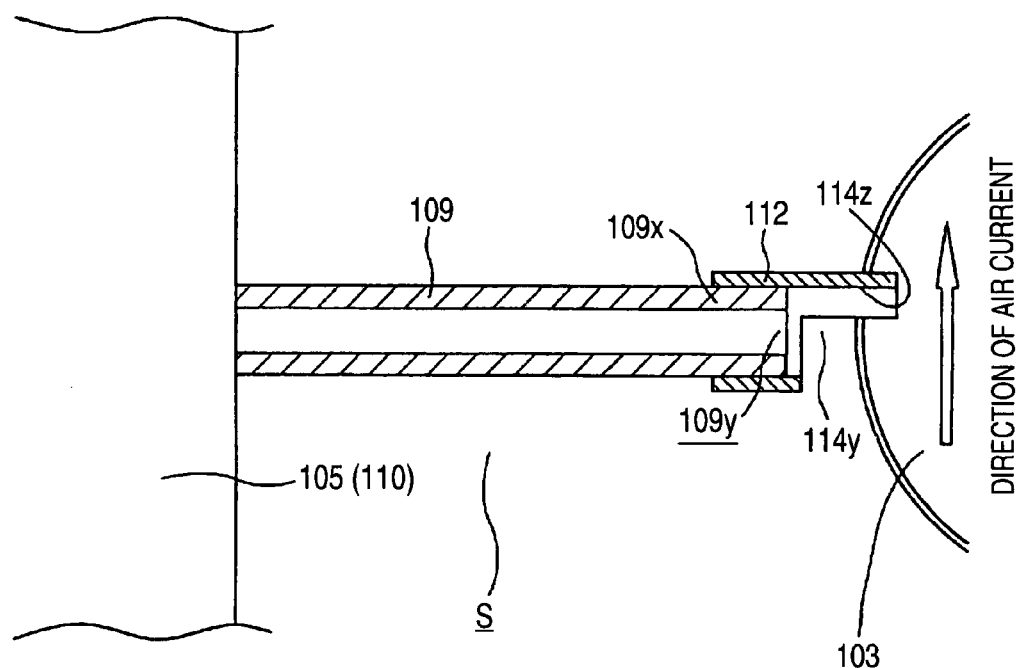
FIG. 15A is a view showing a nozzle for lubricant supply provided in an oil feeding unit used in a rolling bearing device according to an example 6 of the invention as seen in the radial direction of the bearing.
Figure 15B:
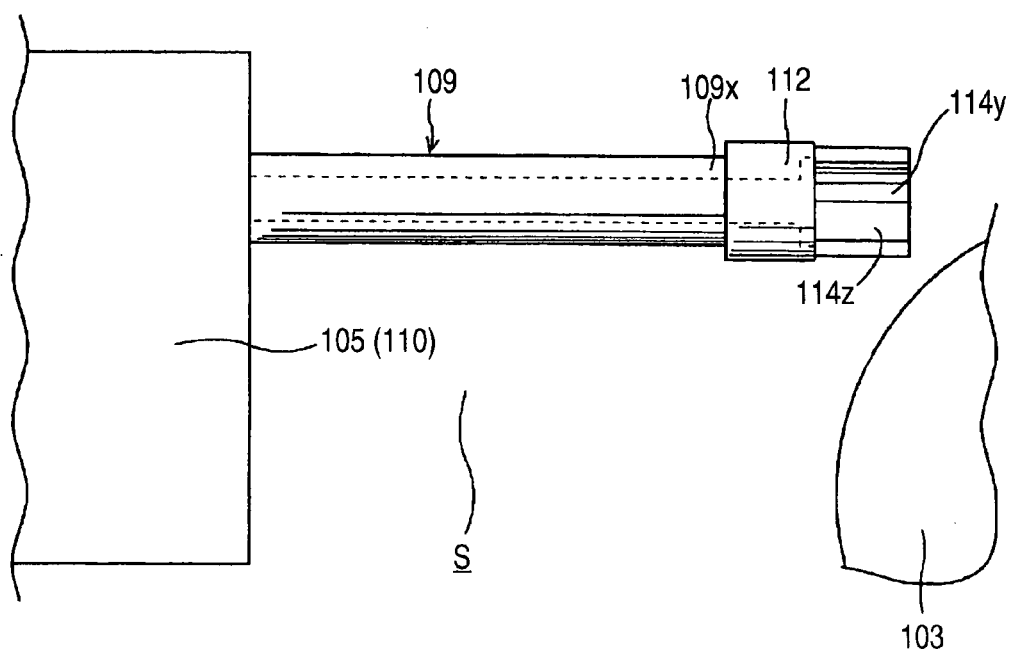
FIG. 15B is a view showing the nozzle in FIG. 15A as seen in the circumferential direction of the bearing.
Figure 15C:
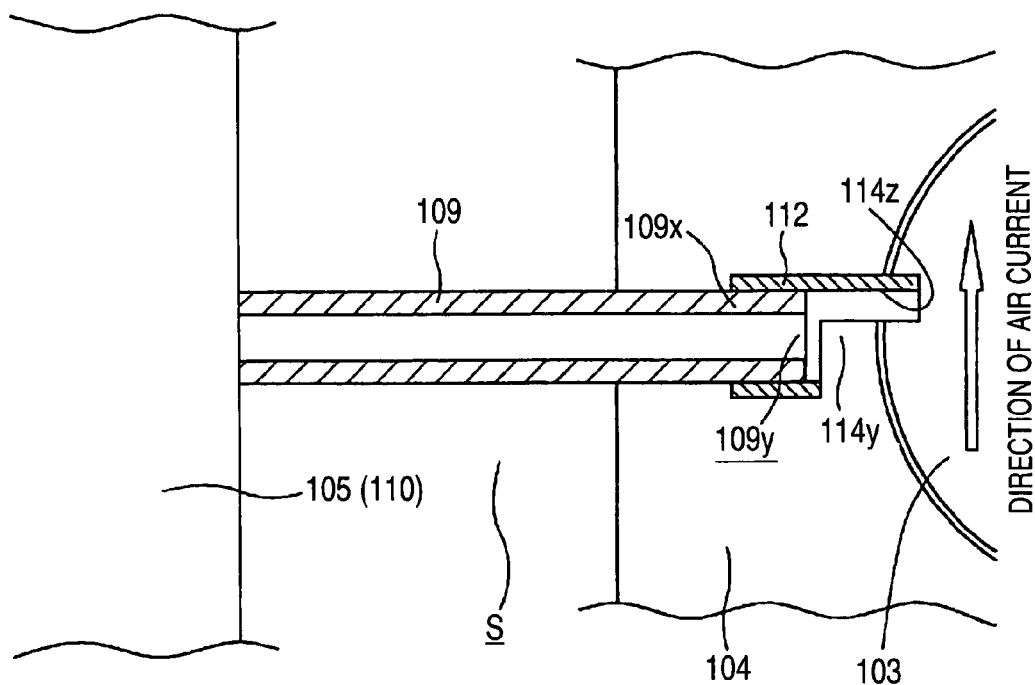
FIG. 15C is a view showing a nozzle for lubricant supply provided in an oil feeding unit used in a rolling bearing device according to a variant of the example 6 in accordance with the invention as seen in the radial direction of the bearing.
Figure 15D:
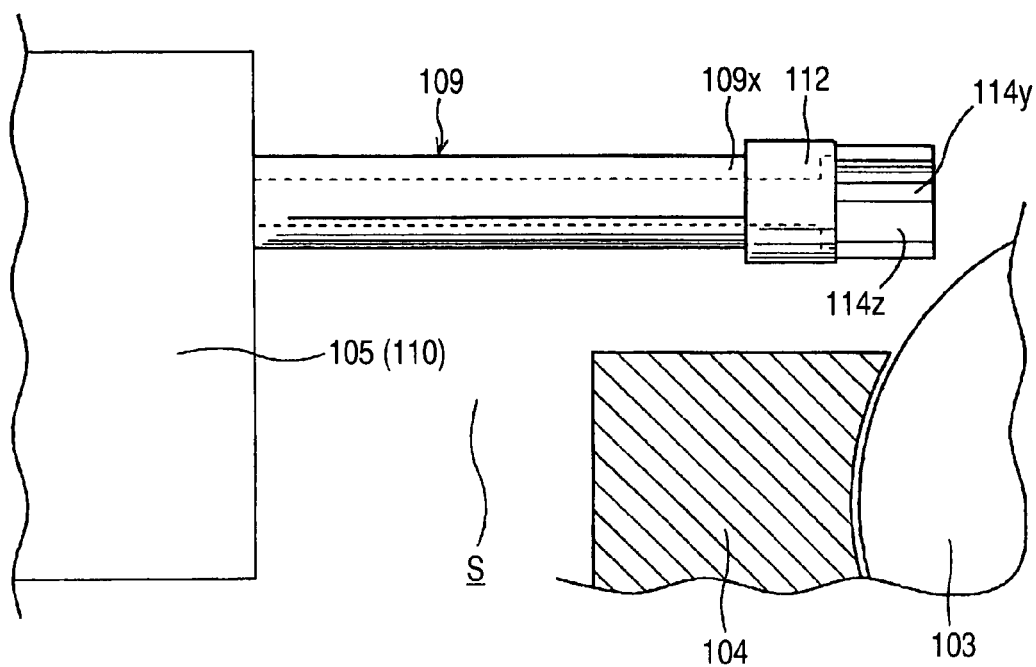
FIG. 15D is a view showing the nozzle in FIG. 15C as seen in the circumferential direction of the bearing.
Figure 16A:
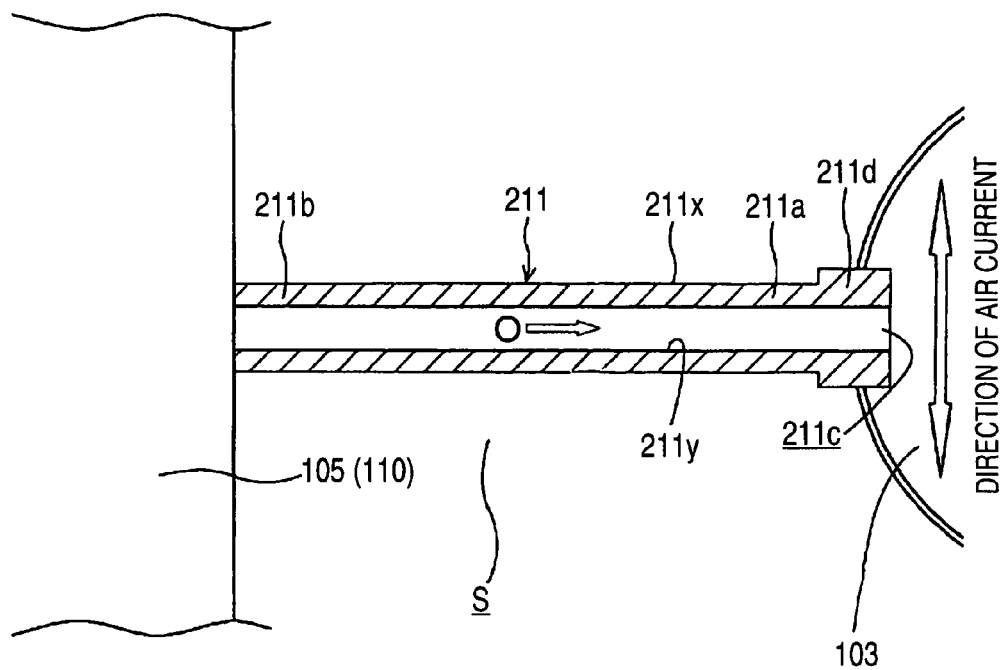
FIG. 16A is a view showing a nozzle for lubricant supply provided in an oil feeding unit used in a rolling bearing device according to an example 7 of the invention as seen in the radial direction of the bearing.
Figure 16B:
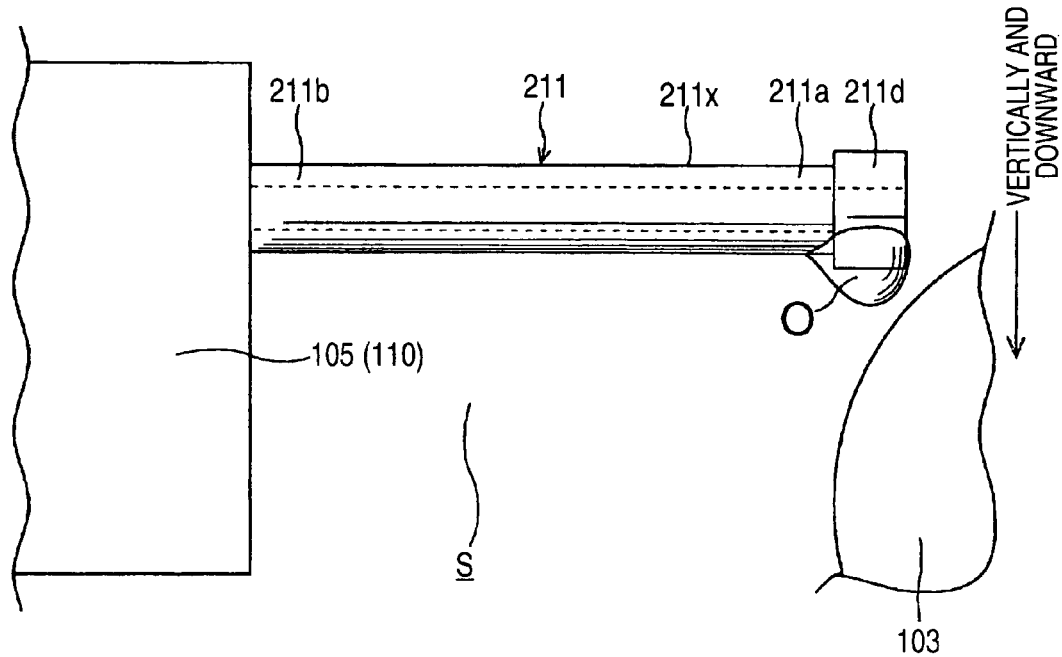
FIG. 16B is a view showing the nozzle in FIG. 16A as seen in the circumferential direction of the bearing.
Figure 16C:
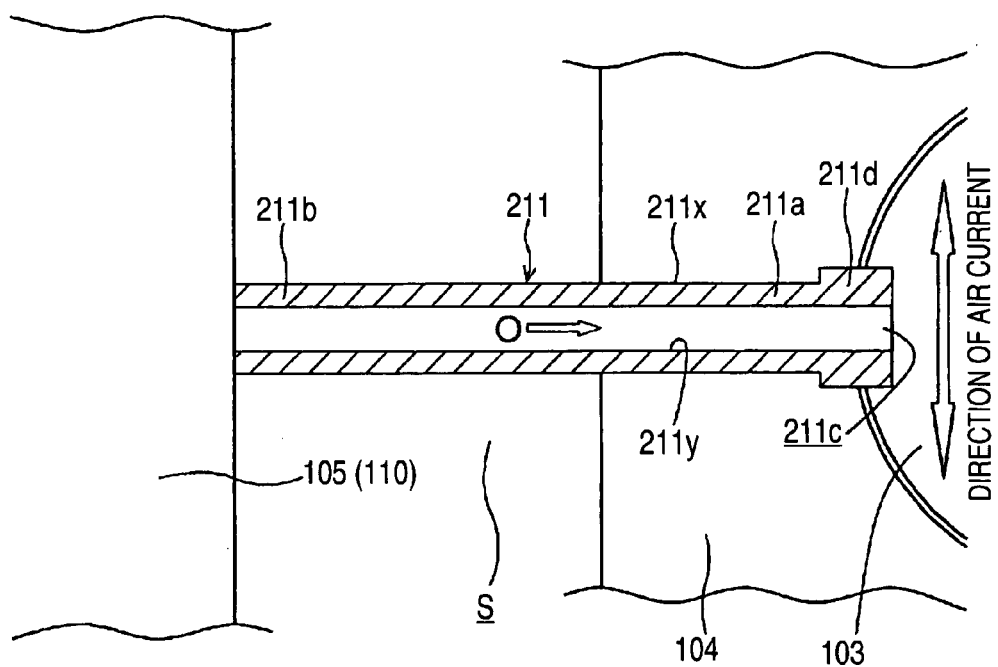
FIG. 16C is a view showing a nozzle for lubricant supply provided in an oil feeding unit used in a rolling bearing device according to a variant of the example 7 in accordance with the invention as seen in the radial direction of the bearing.
Figure 16D:
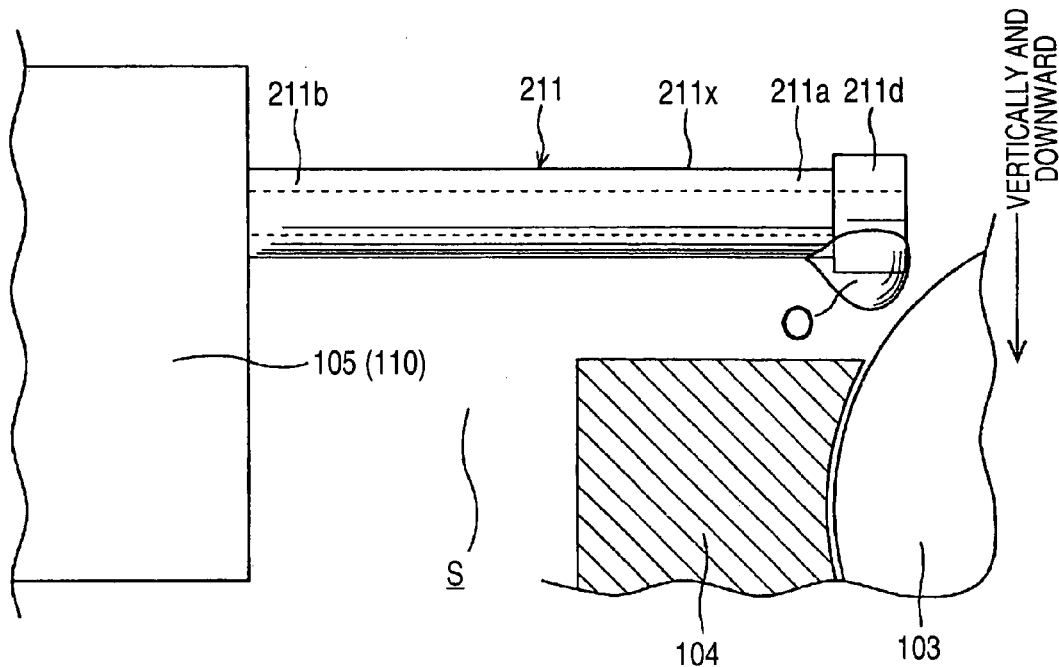
FIG. 16D is a view showing the nozzle in FIG. 16C as seen in the circumferential direction of the bearing.
Figure 17A:
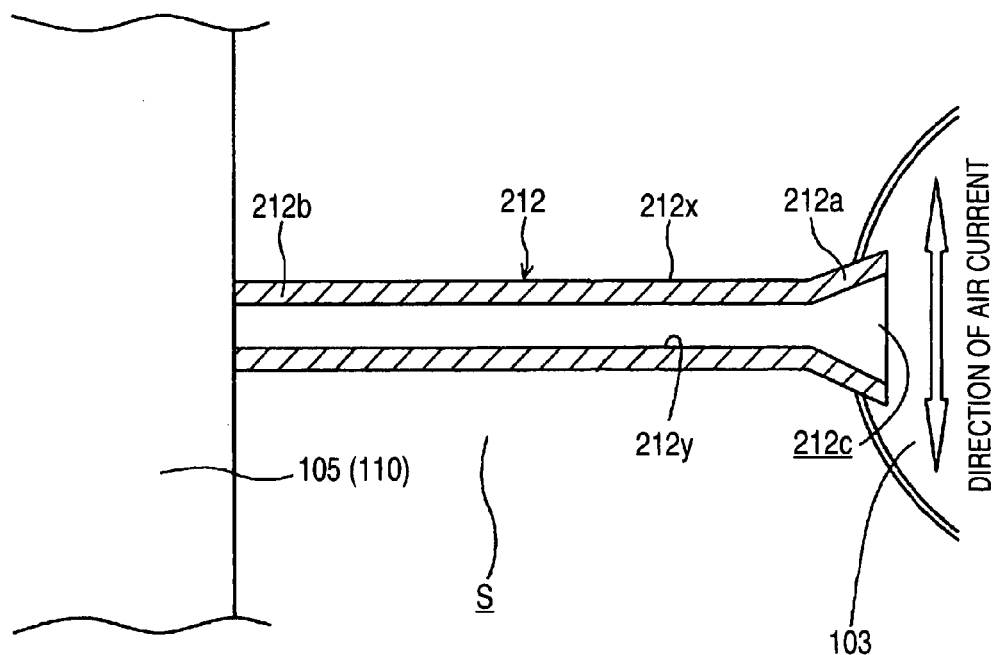
FIG. 17A is a view showing a nozzle for lubricant supply provided in an oil feeding unit used in a rolling bearing device according to an example 8 of the invention as seen in the radial direction of the bearing.
Figure 17B:
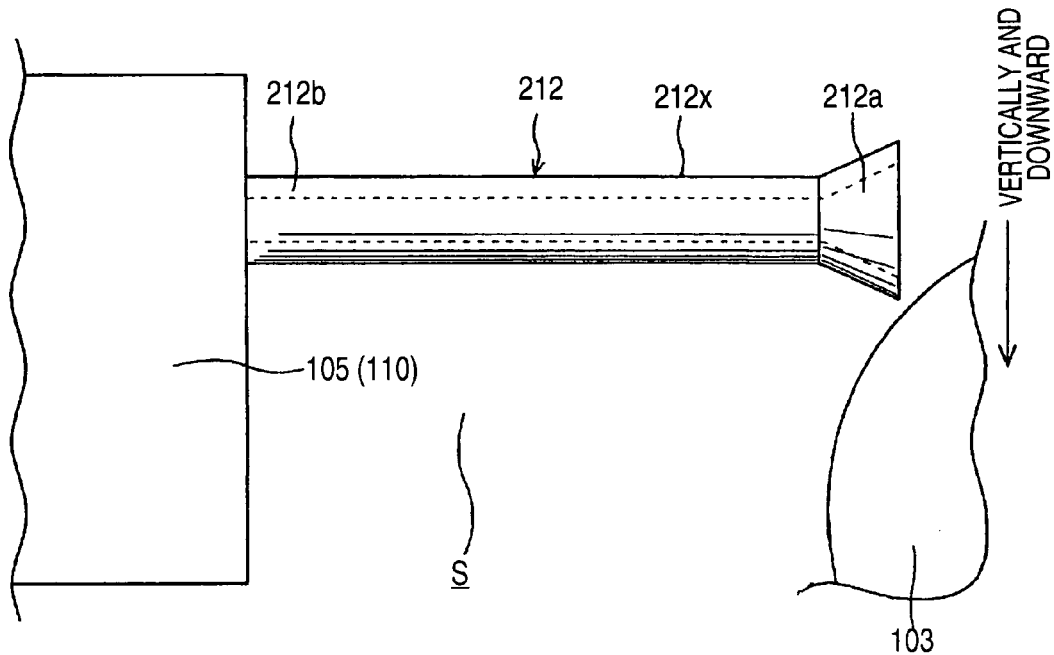
FIG. 17B is a view showing the nozzle in FIG. 17A as seen in the circumferential direction of the bearing.
Figure 17C:
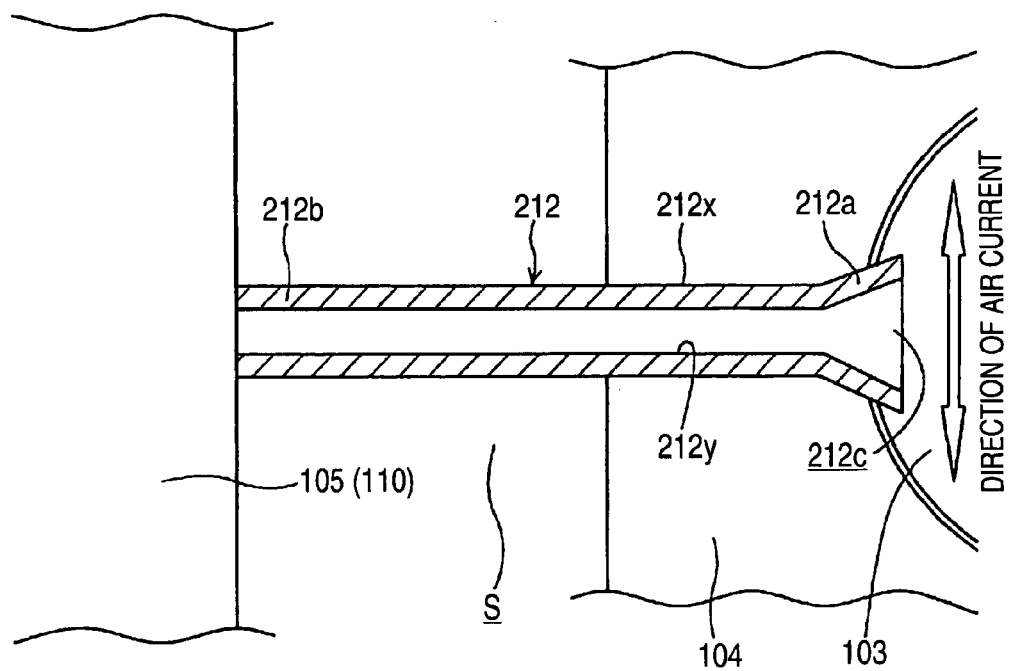
FIG. 17C is a view showing a nozzle for lubricant supply provided in an oil feeding unit used in a rolling bearing device according to a variant of the example 8 in accordance with the invention as seen in the radial direction of the bearing.
Figure 17D:
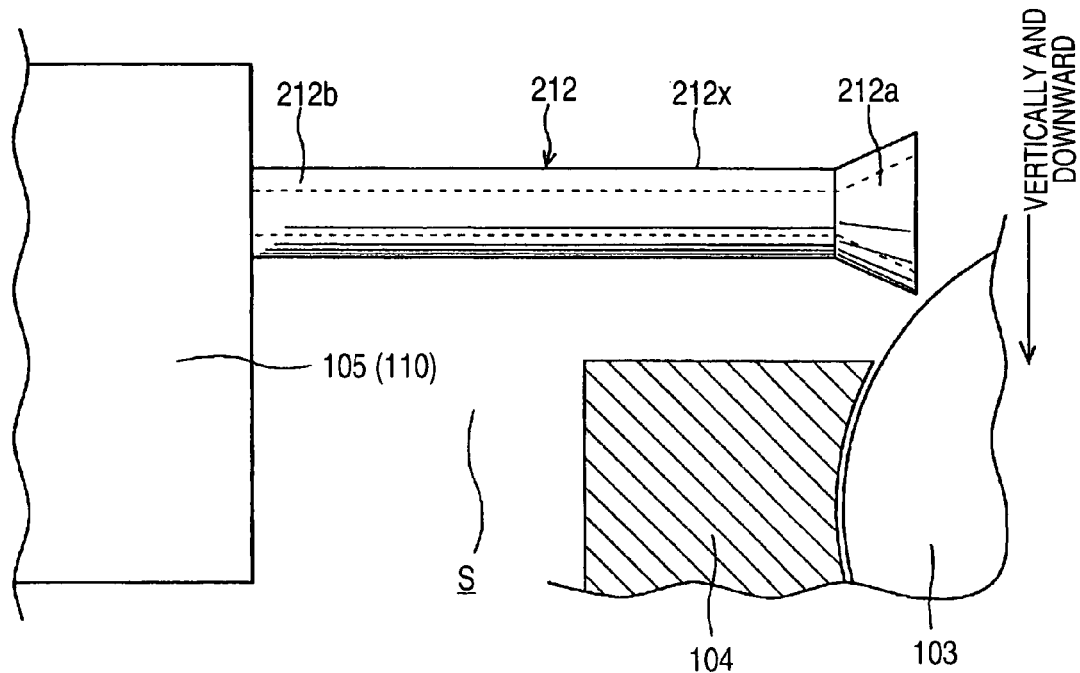
FIG. 17D is a view showing the nozzle in FIG. 10C as seen in the circumferential direction of the bearing.
Figure 18A:
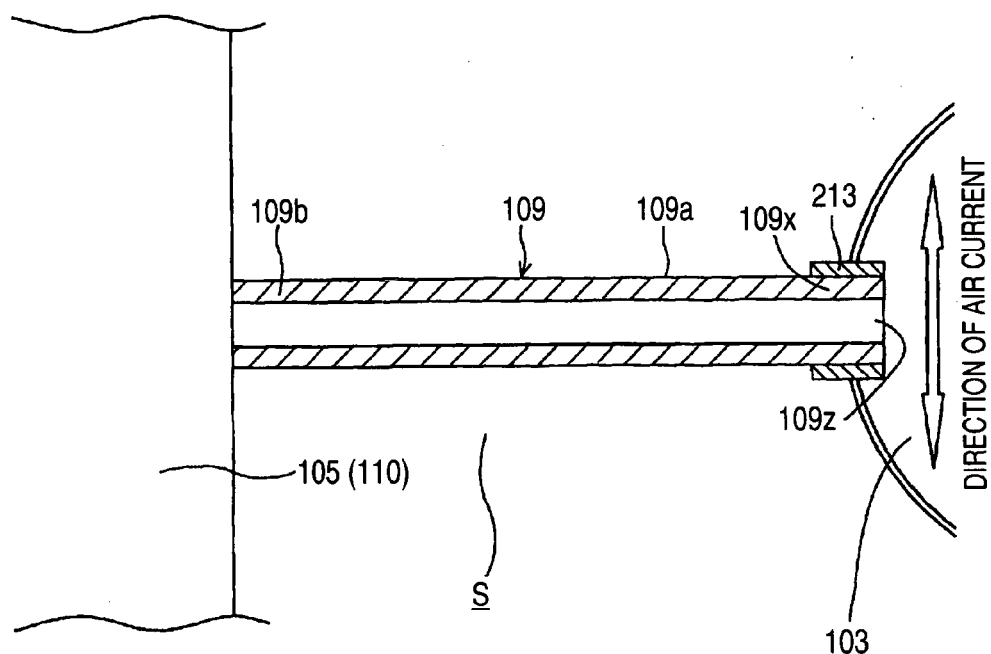
FIG. 18A is a view showing a nozzle for lubricant supply provided in an oil feeding unit used in a rolling bearing device according to an example 9 of the invention as seen in the radial direction of the bearing.
Figure 18B:
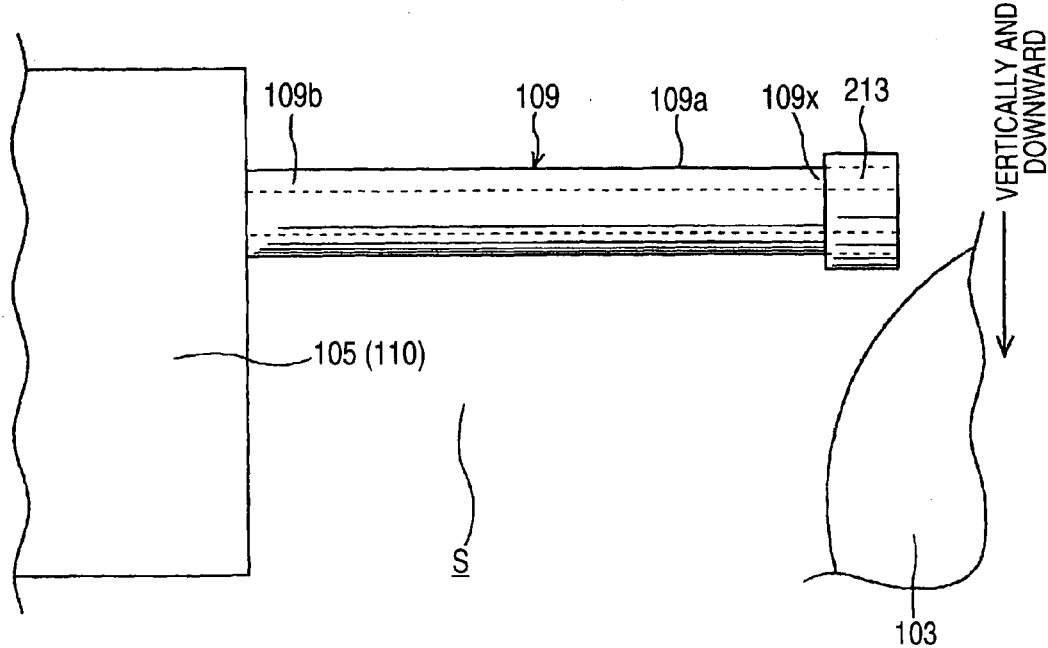
FIG. 18B is a view showing the nozzle in FIG. 18A as seen in the circumferential direction of the bearing.
Figure 18C:
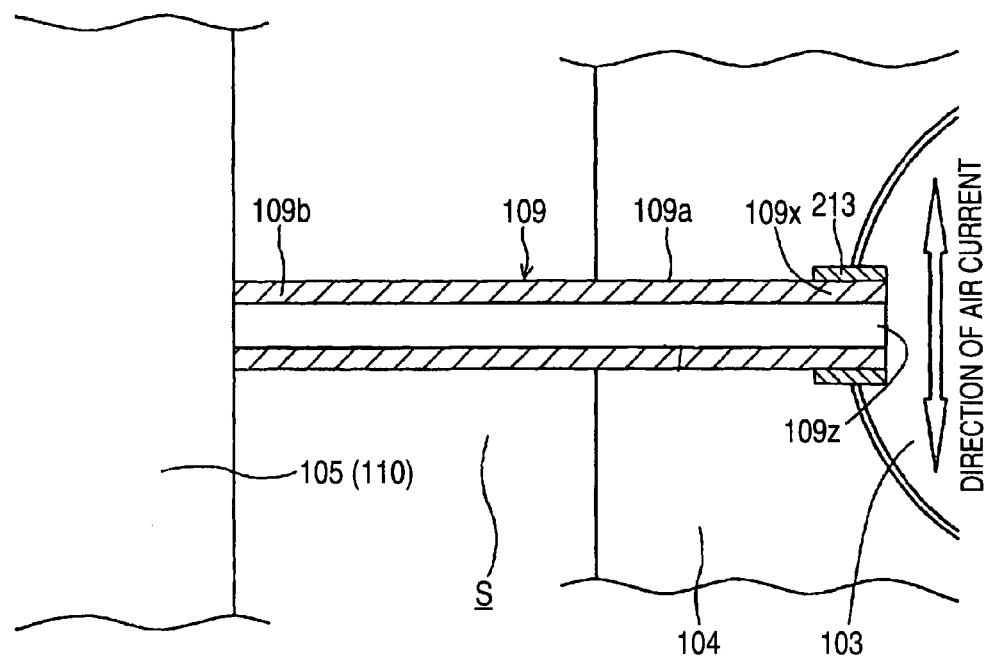
FIG. 18C is a view showing a nozzle for lubricant supply provided in an oil feeding unit used in a rolling bearing device according to a variant of the example 9 in accordance with the invention as seen in the radial direction of the bearing.
Figure 18D:
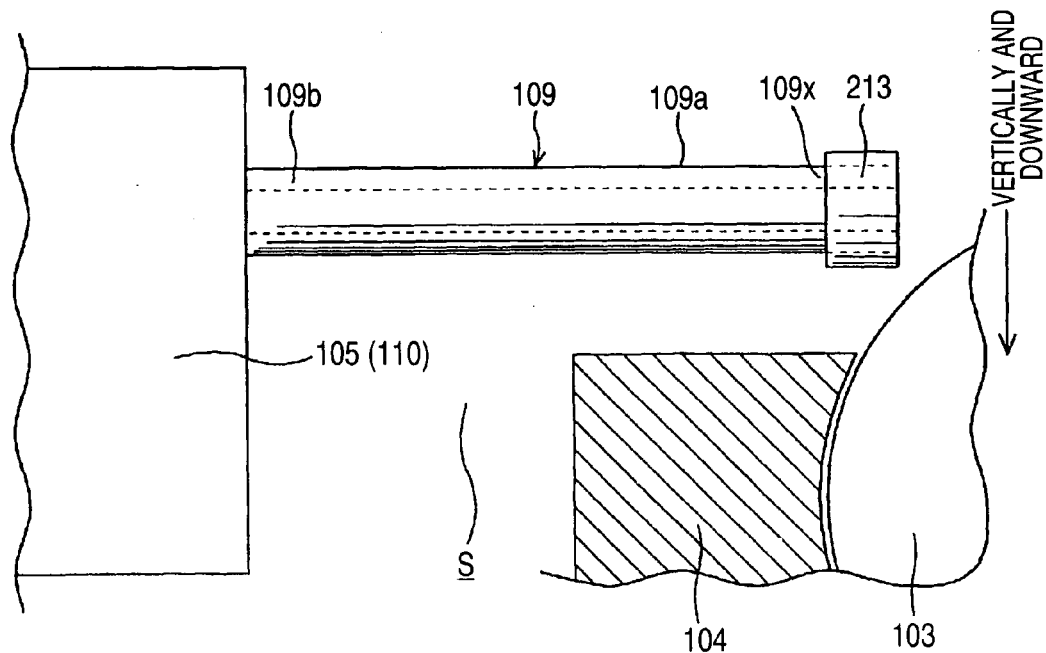
FIG. 18D is a view showing the nozzle in FIG. 18C as seen in the circumferential direction of the bearing.
Figure 19:
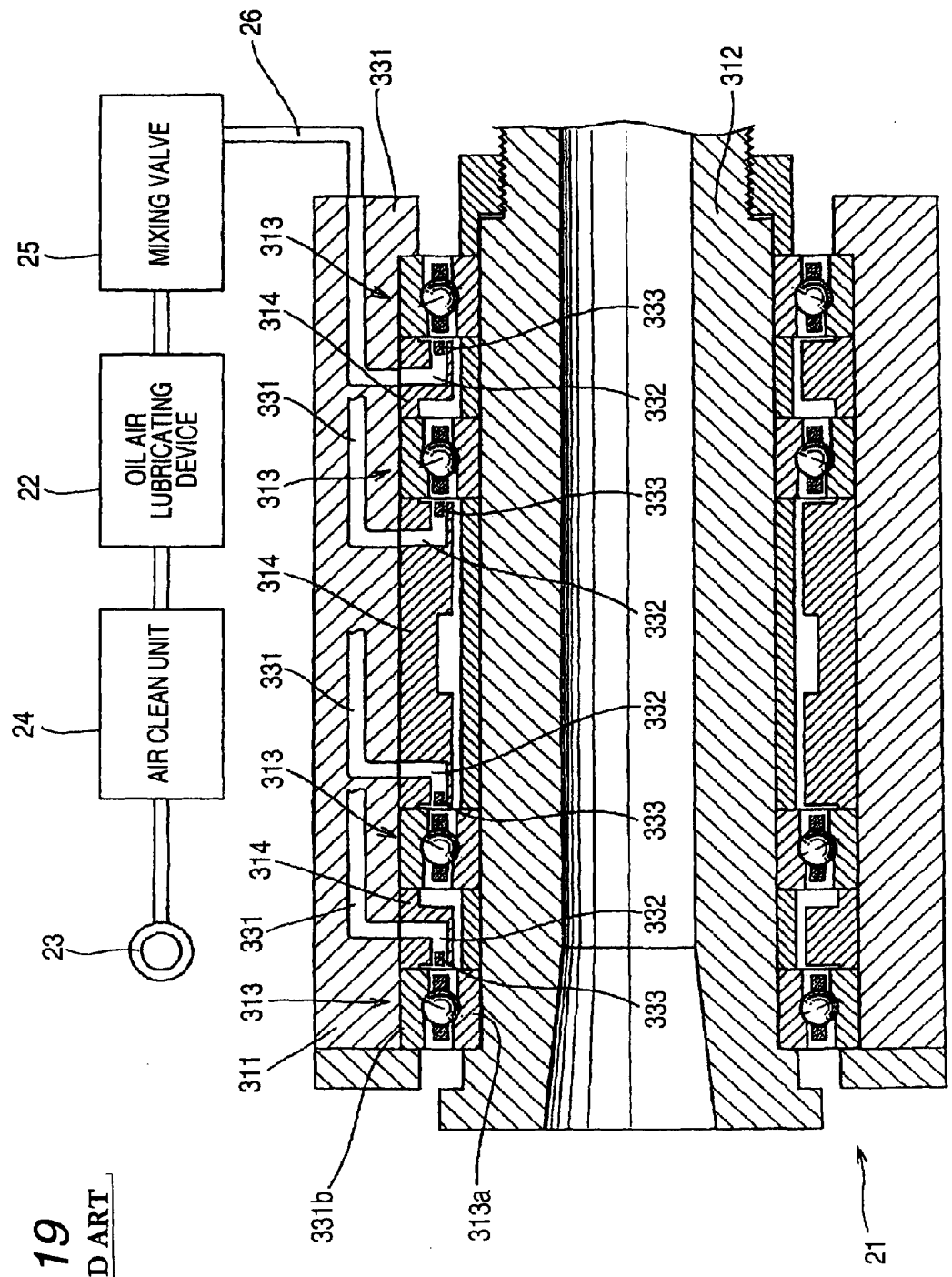
FIG. 19 is a view including a sectional view illustrating an example of a structure of a conventional spindle using an oil air lubricating method and a block diagram illustrating an example of a structure of an external device for lubrication together.
Figure 20:
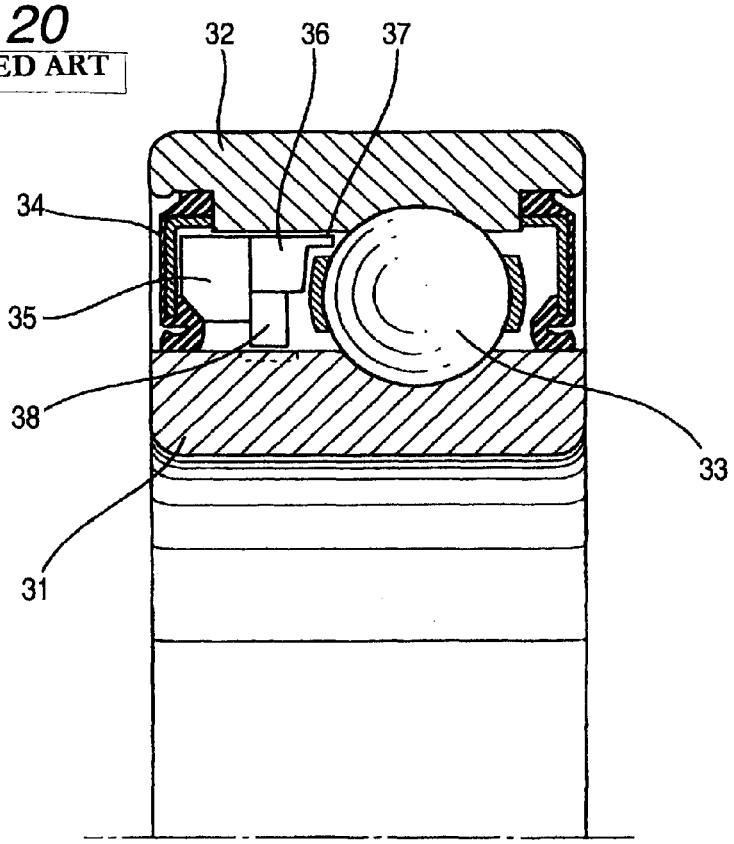
FIG. 20 is an axial sectional view showing an example of a structure of a conventional rolling bearing device incorporating an oil feeding unit for lubrication in a rolling bearing.
Figure 21A:
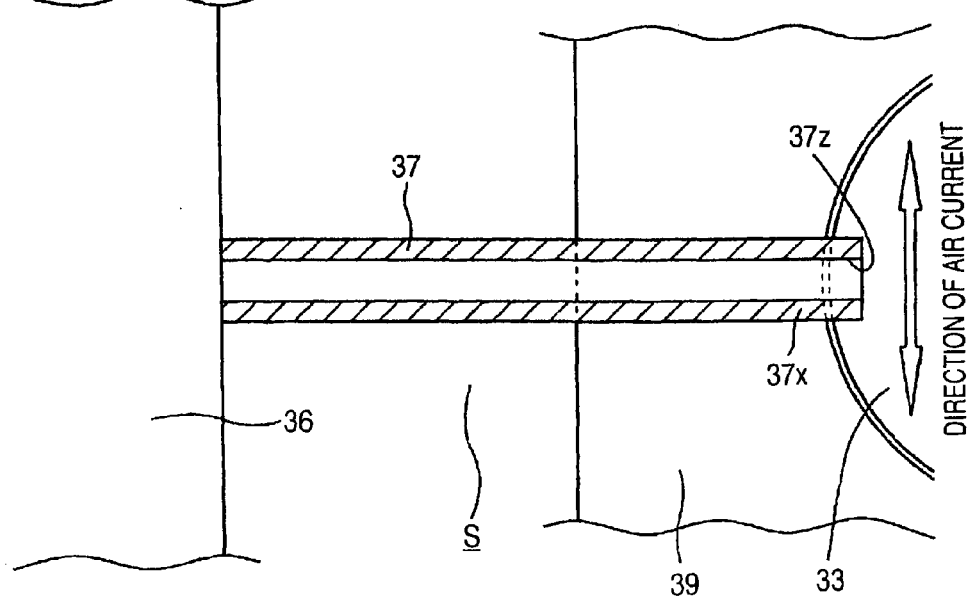
FIG. 21A is a view showing a nozzle for lubricant supply provided in an oil feeding unit used in a conventional rolling bearing device as seen in a radial direction of a bearing.
Figure 21B:
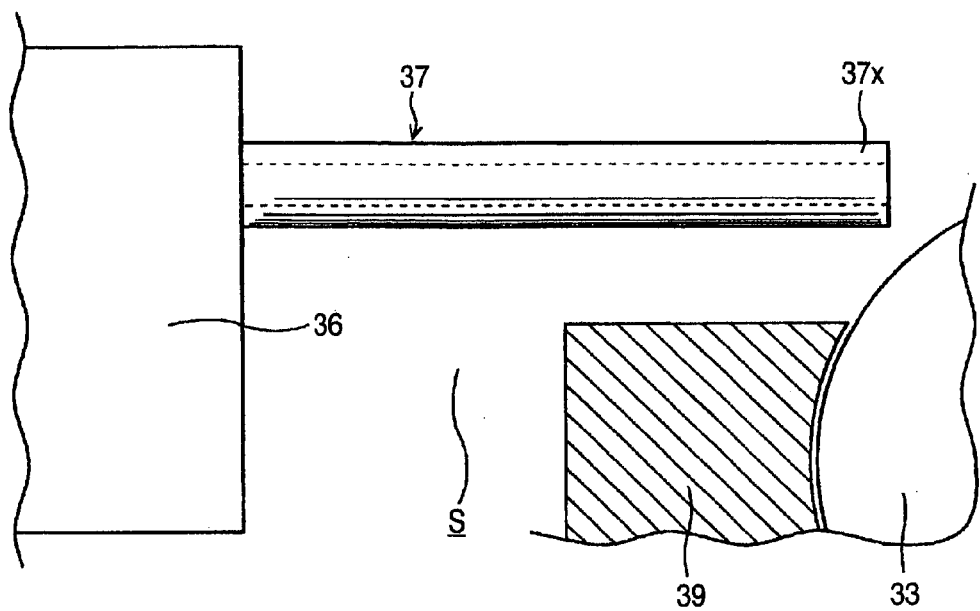
FIG. 21B is a view showing the nozzle in FIG. 21A as seen in a circumferential direction of the bearing.
Figure 22:
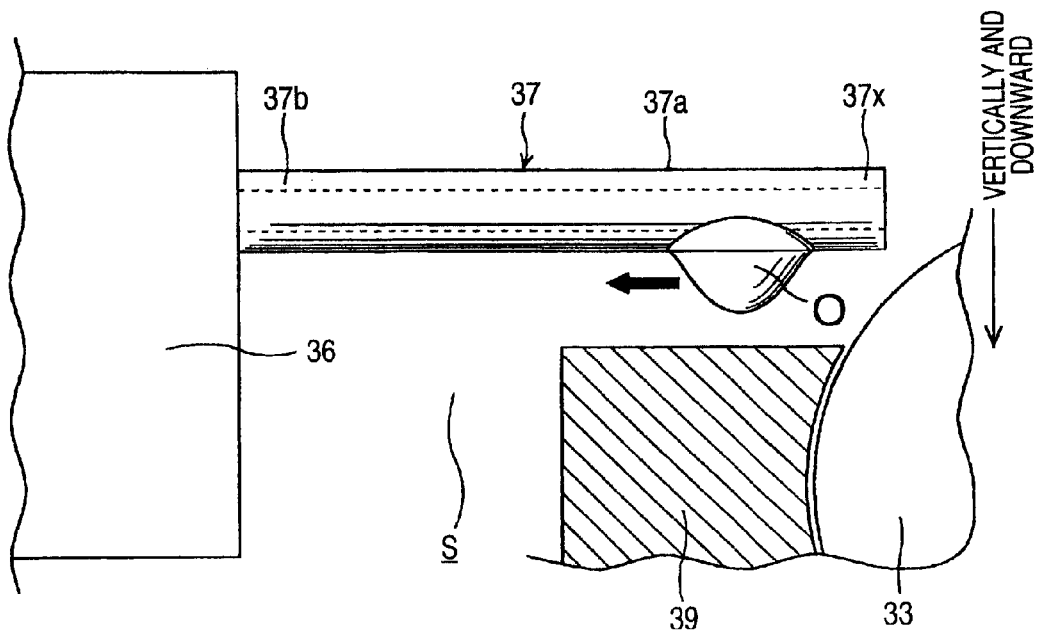
FIG. 22 is a view for explaining problems of the nozzle for lubricant supply provided in the oil feeding unit used in the conventional rolling bearing device.

The invention claimed is:

1. A rolling bearing device comprising:
a pair of raceway members which are disposed concentrically and define an annular-shaped space radially and axially therebetween;
rolling elements disposed in the annular-shaped space; and
a pump including a pipe-shaped nozzle, the pump being disposed in the annular-shaped space or adjacent thereof,
wherein a tip portion of the nozzle is disposed in the annular-shaped space so as to supply lubricant to a vicinity of the rolling elements,
wherein the nozzle is provided with a hole for discharging lubricating oil such that an opening of the hole faces in substantially a circumferential direction of the annular-shaped space,
wherein the opening of the hole is disposed on a circumferential surface of the nozzle at a position spaced from a tip end of the nozzle,
wherein the tip end of the nozzle, which is directed in an axial direction of the raceway member, is closed, and
wherein a tip hole in the tip end of the nozzle, which is directed in the axial direction of the raceway member, is closed with a sealing member.

2. The rolling bearing device according to claim 1, further comprising a cage for holding the rolling elements in the annular-shaped space at predetermined intervals, the tip portion of the nozzle being disposed in the annular-shaped space so as to supply the lubricant to the vicinity of the rolling elements or the cage.

3. The rolling bearing device according to claim 2, wherein the hole axially overlaps the cage.

4. The rolling bearing device according to claim 1, wherein the hole of the nozzle is formed in a position corresponding to a circumferential direction of the bearing on a peripheral surface of the nozzle.

5. The rolling bearing device according to claim 1, wherein the hole is formed such that a portion of the nozzle is disposed between the hole and an axially distal end of the nozzle.

6. The rolling bearing device according to claim 1, wherein the hole is formed in a position such that a portion of the nozzle separates the hole, in an axial direction of the nozzle, from a distal end of the nozzle which is opposite the pump.

7. The rolling bearing device according to claim 1, wherein the hole comprises a plurality of holes.

8. The rolling bearing device according to claim 1, wherein the hole comprises a plurality of holes, and
wherein the plurality of holes open to face in opposite directions.

9. The rolling bearing device according to claim 1, wherein the hole faces a direction perpendicular to a direction an axially distal end face of the nozzle faces.

10. The rolling bearing device according to claim 1, wherein the tip portion of the nozzle faces in the axial direction.

11. The rolling bearing device according to claim 1, wherein the tip portion of the nozzle axially overlaps the rolling elements.

12. The rolling bearing device according to claim 1, wherein a distal end face of a distal end of the nozzle faces in the axial direction.

13. The rolling bearing device according to claim 1, wherein the nozzle extends in an axial direction from a portion of the nozzle connected to the pump to a distal end of the nozzle.

14. The rolling bearing device according to claim 1, wherein the hole is configured so as to reduce a negative pressure in the nozzle caused by a wind pressure generated by a rolling motion of the rolling elements.

15. The rolling bearing device according to claim 1, wherein the sealing member comprises a resin member.

16. The rolling bearing device according to claim 1, wherein an end of the nozzle opposite the pump is sealed with the sealing member disposed in the end of the nozzle such that the hole is disposed between a side of the sealing member closest to the pump and the pump.

17. A rolling bearing device comprising:
a pair of raceway members which are disposed concentrically and define an annular-shaped space radially and axially therebetween;
rolling elements disposed in the annular-shaped space; and
a pump including a pipe-shaped nozzle, the pump being disposed in the annular-shaped space or adjacent thereof,
wherein a tip portion of the nozzle is disposed in the annular-shaped space so as to supply lubricant to a vicinity of the rolling elements,
wherein the nozzle is provided with a hole for discharging lubricating oil such that an opening of the hole faces in substantially a circumferential direction of the annular-shaped space, and
wherein an end of the nozzle opposite the pump is sealed with a resin member such that the hole is disposed between a side of the resin member closest to the pump and the pump.

18. A rolling bearing device comprising:
a pair of raceway members which are disposed concentrically and define an annular-shaped space radially and axially therebetween;
rolling elements disposed in the annular-shaped space; and
a pump including a pipe-shaped nozzle, the pump being disposed in the annular-shaped space or adjacent thereof,
wherein a tip portion of the nozzle is disposed in the annular-shaped space so as to supply lubricant to a vicinity of the rolling elements,
wherein the nozzle is provided with a hole for discharging lubricating oil such that an opening of the hole faces in a direction excluding an axial direction and a radial direction of the rolling bearing device, and
wherein an end of the nozzle opposite the pump is sealed with a resin member such that the hole is disposed between a side of the resin member closest to the pump and the pump.

19. The rolling bearing device according to claim 18, wherein an angle formed by a centerline of the hole and a tangential line in the circumferential direction on a central point of the nozzle is equal to or less than 75 degrees.

20. The rolling bearing device according to claim 18, wherein an angle formed by a centerline of the hole and a tangential line in the circumferential direction on a central point of the nozzle is equal to or less than 45 degrees.

* * * * *